US012002438B1

(12) United States Patent
Million

(10) Patent No.: US 12,002,438 B1
(45) Date of Patent: Jun. 4, 2024

(54) SYSTEMS, APPARATUS, AND METHODS FOR REMOTELY ACTUATING A DRUM STRIKER

(71) Applicant: Jeffery Thomas Million, Sterling, VA (US)

(72) Inventor: Jeffery Thomas Million, Sterling, VA (US)

( * ) Notice: Subject to any disclaimer, the term of this patent is extended or adjusted under 35 U.S.C. 154(b) by 59 days.

(21) Appl. No.: 17/512,553

(22) Filed: Oct. 27, 2021

Related U.S. Application Data

(60) Provisional application No. 63/106,271, filed on Oct. 27, 2020.

(51) Int. Cl.
*G10D 13/11* (2020.01)
*G10D 13/02* (2020.01)

(52) U.S. Cl.
CPC ............. *G10D 13/11* (2020.02); *G10D 13/02* (2013.01)

(58) Field of Classification Search
CPC ............................... G10D 13/11; G10D 13/02
See application file for complete search history.

(56) References Cited

U.S. PATENT DOCUMENTS 1,045,357 A * 11/1912 Anderson .............. G10D 13/11 84/411 R
1,055,688 A * 3/1913 Wood ......................... G10F 1/08 84/104
1,085,308 A * 1/1914 Van Valkenburg ....... G10F 1/08 84/104
1,110,364 A * 9/1914 Wiggen ............... G10H 1/0083 84/104
1,379,654 A * 5/1921 Sommermeyer ....... A63J 25/00 84/6
1,646,061 A * 10/1927 Lifshitz .................. G10D 13/26 84/422.1
1,685,090 A * 9/1928 Lifshitz ................ G10H 1/0066 84/DIG. 12
2,445,486 A * 7/1948 La Londe ............. G10D 13/11 84/422.1
2,822,717 A * 2/1958 Slawienski ............... G10F 1/08 84/422.1

(Continued)

FOREIGN PATENT DOCUMENTS

WO WO-2015117073 A2 * 8/2015 ........... G10D 13/006

OTHER PUBLICATIONS

"5000 SeriesTM Pedals," Web page http://www2.dwdrums.com/hardware/5000/pedals.asp, 9 pages, Sep. 14, 2020, retrieved from Internet Archive Wayback Machine https://web.archive.org/web/20200914022019/http://www2.dwdrums.com/hardware/5000/pedals.asp on Aug. 3, 2022.

(Continued)

*Primary Examiner* — Robert W Horn
(74) *Attorney, Agent, or Firm* — COOLEY LLP

(57) ABSTRACT

In some embodiments, a system includes a remote actuator and a striker actuator assembly. The remote actuator is operatively coupled to the striker actuator assembly by a remote coupling. The striker actuator assembly includes a mount configured to couple a striker to a drum. The striker actuator assembly is configured to transition the striker between a non-contact and a contact position relative to a surface of a drumhead (e.g., a non-vertical surface of a drumhead) of a drum in response to actuation of the remote actuator.

21 Claims, 31 Drawing Sheets

(56) References Cited

U.S. PATENT DOCUMENTS

| | | | | | |
|---|---|---|---|---|---|
| 3,747,464 | A * | 7/1973 | Russell | G10D 13/11 | |
| | | | | 84/422.1 | |
| 3,967,523 | A * | 7/1976 | Currier | G10D 13/11 | |
| | | | | 84/422.1 | |
| 4,747,333 | A * | 5/1988 | Hoshino | G10D 13/11 | |
| | | | | 84/422.1 | |
| 5,270,480 | A * | 12/1993 | Hikawa | G10H 1/0066 | |
| | | | | 84/645 | |
| 5,438,903 | A * | 8/1995 | Cropek | G10D 13/065 | |
| | | | | 84/422.3 | |
| 5,446,236 | A * | 8/1995 | Nakada | G10F 5/02 | |
| | | | | 446/298 | |
| 5,453,567 | A * | 9/1995 | Brinson | G10F 1/08 | |
| | | | | 84/411 R | |
| 5,550,319 | A * | 8/1996 | Segan | G10F 1/10 | |
| | | | | 116/167 | |
| 5,789,688 | A * | 8/1998 | Schiano | G10D 13/065 | |
| | | | | 84/422.1 | |
| 6,201,173 | B1 * | 3/2001 | Black | G10D 13/11 | |
| | | | | 84/746 | |
| 7,232,947 | B1 * | 6/2007 | Lombardi | G10D 13/065 | |
| | | | | 84/327 | |
| 7,262,356 | B1 * | 8/2007 | Lukios, II | G10D 13/11 | |
| | | | | 84/411 R | |
| 7,351,902 | B1 * | 4/2008 | Sikra | G10D 13/065 | |
| | | | | 84/422.1 | |
| 7,365,258 | B1 * | 4/2008 | Lombardi | G10D 13/02 | |
| | | | | 84/422.1 | |
| 7,608,771 | B2 * | 10/2009 | Fournier | G10D 13/11 | |
| | | | | 84/422.1 | |
| 7,804,015 | B1 * | 9/2010 | Wilson | G10D 13/11 | |
| | | | | 84/422.1 | |
| 8,242,343 | B2 | 8/2012 | Jones et al. | | |
| 8,389,848 | B1 * | 3/2013 | Baker | G10D 13/11 | |
| | | | | 84/746 | |
| 8,884,145 | B1 * | 11/2014 | Lin | G10D 13/02 | |
| | | | | 84/422.1 | |
| 9,230,522 | B1 * | 1/2016 | Lin | G10D 13/11 | |
| 9,646,583 | B2 * | 5/2017 | Bailey | G10D 13/065 | |
| 9,741,323 | B2 * | 8/2017 | Gold | G10D 13/065 | |
| 9,858,904 | B1 * | 1/2018 | Gold | G10D 13/03 | |
| 10,600,394 | B2 * | 3/2020 | Lin | G10D 13/02 | |
| 10,825,429 | B2 * | 11/2020 | Gold | G10D 13/28 | |
| 10,867,589 | B2 * | 12/2020 | Sikra | G10D 13/11 | |
| 10,937,400 | B1 * | 3/2021 | Chu | G10D 13/02 | |
| 11,404,034 | B1 * | 8/2022 | Burns, Jr. | G10D 13/26 | |
| 2005/0150355 | A1 * | 7/2005 | Sutej | G10D 13/065 | |
| | | | | 84/422.3 | |
| 2005/0172784 | A1 * | 8/2005 | Lee | G10D 13/065 | |
| | | | | 84/422.1 | |
| 2012/0097011 | A1 * | 4/2012 | Leopold | G10D 13/11 | |
| | | | | 84/422.4 | |
| 2019/0156796 | A1 * | 5/2019 | Sikra | G10D 13/11 | |
| 2024/0005894 | A1 * | 1/2024 | Mayo | G10D 13/11 | |

OTHER PUBLICATIONS

"9000 SeriesTM Heavy Duty Hardware," Web page http://www2.dwdrums.com/hardware/9000/hardware.asp, 15 pages, Aug. 14, 2020, retrieved from Internet Archive Wayback Machine https://web.archive.org/web/20200814143947/http://www2.dwdrums.com/hardware/9000/hardware.asp on Aug. 3, 2022.

"9000 SeriesTM Pedals," Web page http://www2.dwdrums.com/hardware/9000/pedals.asp, 2 pages, Sep. 25, 2020, retrieved from Internet Archive Wayback Machine https://web.archive.org/web/20200925101315/http://www2.dwdrums.com/hardware/9000/pedals.asp on Aug. 3, 2022.

"All-Birch Collector's Series® Snare—Natural Satin with Chrome Hardware," Web page http://www2.dwdrums.com/showroom/snares.asp?sKITNAME=snare-all-birch, 1 page, Jun. 17, 2020, retrieved from Internet Archive Wayback Machine https://web.archive.org/web/20200617180308/http://www2.dwdrums.com/showroom/snares.asp?sKITNAME=snare-all-birch.

"DDCT2520BLCR—DW Design Series Pancake Drum," Web page https://store.dwdrums.com/p/ddct2520blcr-dw-design-series-pancake-drum-2-5x20-inch-black-satin?pp=10, 1 page, Aug. 4, 2020, retrieved from Internet Archive Wayback Machine https://web.archive.org/web/20200804105205/https://store.dwdrums.com/p/ddct2520blcr-dw-design-series-pancake-drum-2-5x20-inch-black-satin?pp=10 on Aug. 3, 2022.

"DWCP9502LB8—9000 Series Remote Cable Hi-Hat Stand," Web page http://www.dwdrums.com/hardware/hw.asp?hw=dwcp9502LB8, 1 page, Feb. 5, 2020, retrieved from Internet Archive Wayback Machine https://web.archive.org/web/20200205222850/http://www.dwdrums.com/hardware/hw.asp?hw=dwcp9502LB8#gsc.tab=0 on Aug. 3, 2022.

"dwcp9909—Bass Drum/Percussion Lifter," Web page http://store.dwdrums.com/p/dwcp9909-bass-drum-percussion-lifter, 1 page, Aug. 20, 2017, retrieved from Internet Archive Wayback Machine https://web.archive.org/web/20170820233026/http://store.dwdrums.com/p/dwcp9909-bass-drum-percussion-lifter on Aug. 3, 2022.

"Giant Step," Web page https://www.sonor.com/instruments/drums/hardware/bass-drum-pedals/giant-step/?L=0, 6 pages, Sep. 21, 2020, retrieved from Internet Archive Wayback Machine https://web.archive.org/web/20200921191626/https://www.sonor.com/instruments/drums/hardware/bass-drum-pedals/giant-step/?L=0 on Aug. 3, 2022.

"Kit of the Month Custom-Shop Chops," Web page https://www.moderndrummer.com/article/october-2017-custom-shop-chops/, 3 pages, Sep. 26, 2020, retrieved from Internet Archive Wayback Machine https://web.archive.org/web/20200926143750/https://www.moderndrummer.com/article/october-2017-custom-shop-chops/ on Aug. 3, 2022.

"Sonor Giant Step Twin Effect Triple Bass Drum Pedal," Web page https://www.sonor.com/instruments/drums/hardware/bass-drum-pedals/giant-step/?L=0, 2 pages, Jun. 6, 2013, retrieved from Internet Archive Wayback Machine https://web.archive.org/web/20130606114721/https://www.zzounds.com/item--SOOGTEP3 on Aug. 3, 2022.

Previ, Dave. "Fishbone's Philip 'Fish' Fisher," Web page https://www.moderndrummer.com/article/october-2017-fishbones-philip-fish-fisher/, 4 pages, Jul. 31, 2020, retrieved from Internet Archive Wayback Machine https://web.archive.org/web/20200731131424/https://www.moderndrummer.com/article/october-2017-fishbones-philip-fish-fisher/ on Aug. 3, 2022.

Screen captures from YouTube video clip entitled "DW 9502LB Remote Hi-Hat Stand Review by Sweetwater," 8 pages, uploaded on Jun. 30, 2015 by user "Sweetwater". Retrieved from Internet: https://www.youtube.com/watch?v=1wPLpweUjN8.

Screen captures from YouTube video clip entitled "Pat Metheny Introduces 'Orchestrion'," 8 pages, uploaded on Jan. 14, 2010 by user "Nonesuch Records". Retrieved from Internet: https://www.youtube.com/watch?v=KsYEOUKS4Yk.

* cited by examiner

SYSTEMS, APPARATUS, AND METHODS FOR REMOTELY ACTUATING A DRUM STRIKER

CROSS-REFERENCE TO RELATED APPLICATIONS

This application claims priority to and the benefit of U.S. Provisional Patent Application Ser. No. 63/106,271, entitled "Systems, Apparatus, and Methods for Remotely Actuating a Drum Striker," filed Oct. 27, 2020, the disclosure of which is incorporated by reference herein in its entirety.

BACKGROUND

The use of existing drum kits is limited by the number of drums that can be physically disposed close enough to a player for the player to be able to engage with the drums using existing foot pedals, hands, and/or sticks. Thus, the arrangement of sounds able to be produced by existing drum kits are limited compared to if the drums of a kit could be remotely actuated. There is a need for drum kit systems and apparatus that allow for drums to be arranged in new relative locations and engaged with indirectly by the player.

SUMMARY

In some embodiments, a system includes a remote actuator and a striker actuator assembly. The remote actuator is operatively coupled to the striker actuator assembly by a remote coupling. The striker actuator assembly includes a mount configured to couple a striker to a drum. The striker actuator assembly is configured to transition the striker between a non-contact and a contact position relative to a surface of a drumhead (e.g., a non-vertical surface of a drumhead) of a drum in response to actuation of the remote actuator. The drumhead can be disposed, for example, in a location that is physically inaccessible to, out of reach of, or unplayable by one or both hands and/or one or both feet of a user of the system (or of a striker in a hand of the user of the system) (e.g., due to distance and/or an obstruction such as another component of a drum kit between the user and the drumhead) during operation of the system by the user.

DETAILED DESCRIPTION

In some embodiments, a system includes a remote actuator and a striker actuator assembly. The remote actuator is operatively coupled to the striker actuator assembly by a remote coupling. The striker actuator assembly includes a mount configured to couple a striker to a drum. The striker actuator assembly is configured to transition the striker between a non-contact and a contact position relative to a surface of a drumhead (e.g., a non-vertical surface of a drumhead) of a drum in response to actuation of the remote actuator. The drumhead can be disposed, for example, out of reach of one or both hands and one or both feet of a user of the system (e.g., due to distance and/or an obstruction such as another component of a drum kit between the user and the drumhead), and thus can be "remote" relative to the remote actuator, during operation of the system by the user.

In some embodiments, a system includes a remote actuator, a remote coupling, and a striker actuator assembly. The remote coupling includes a cable subassembly. The cable subassembly includes a flexible sheath, a cable disposed within the sheath, a first coupling element disposed on a first end of the cable and coupleable to the remote actuator, and a second coupling element disposed on a second end of the cable. The striker actuator assembly is operatively coupleable to the second coupling element and includes a mount configured to couple a striker to a drum. The striker actuator assembly is configured to transition the striker between a non-contact and a contact position relative to a surface of a drumhead of a drum in response to actuation of the remote actuator due to the actuation causing the cable to translate relative to the sheath to cause the striker actuator assembly to transition the striker between the non-contact and the contact position when the drumhead is physically inaccessible to the user.

In some embodiments, a method includes actuating a remote actuator such that a striker actuator assembly operatively coupled to the remote actuator by a remote coupling and coupled to a drum having a drumhead that is physically inaccessible to the user transitions a striker from a non-contact position to a contact position relative to a non-vertical surface of the drumhead to produce a sound. The method further includes disengaging with the remote actuator such that the striker actuator assembly automatically transitions the striker from the contact position to the non-contact position.

Figure 1:
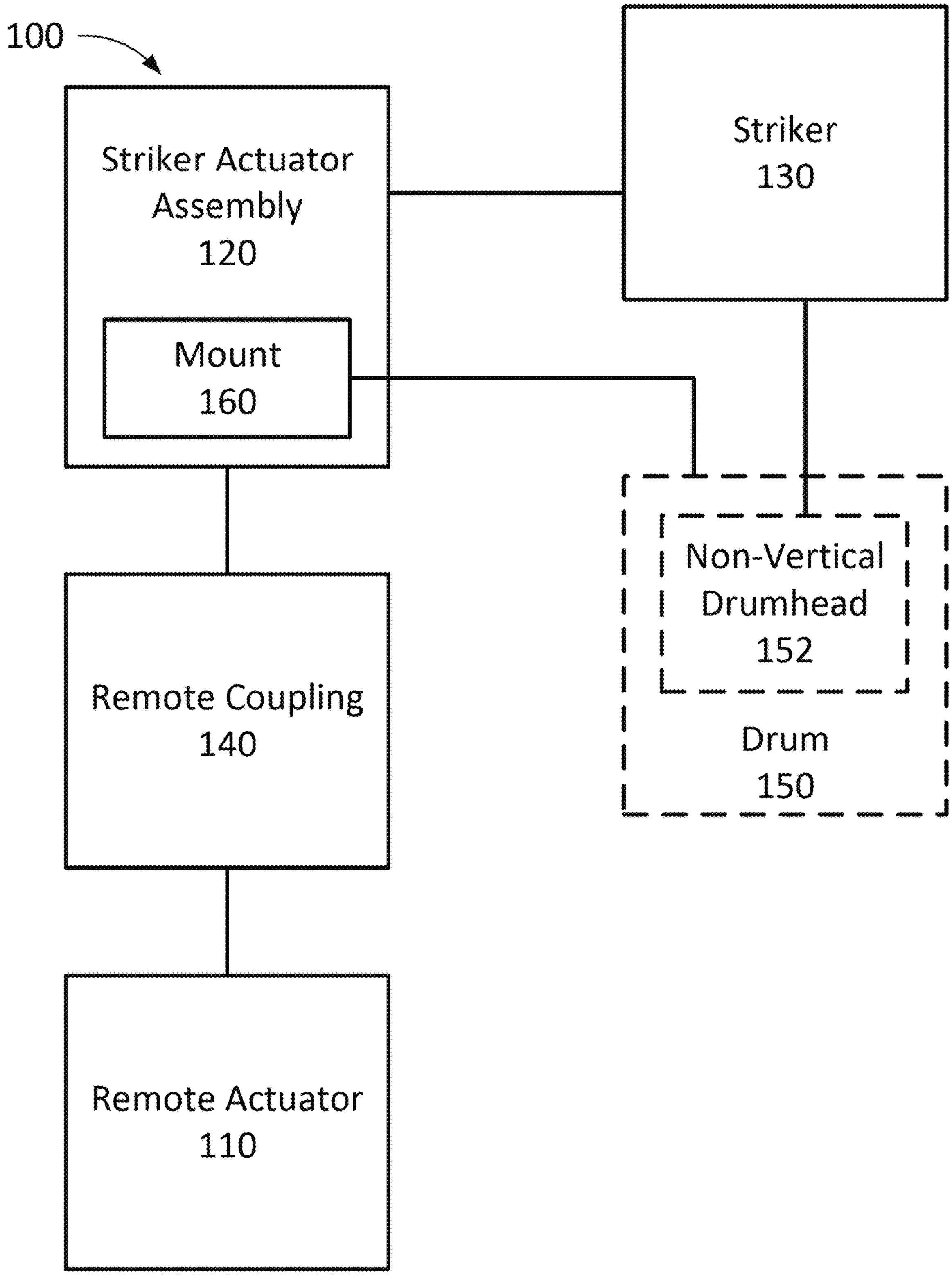
FIG. 1 is a schematic illustration of a system, according to an embodiment.

FIG. 1 is a schematic illustration of a system 100, which may include components having similar structure and/or function to any of the systems described herein. The system 100 includes a remote actuator 110, a striker actuator assembly 120, and a striker 130. The remote actuator 110 is operatively coupled to the striker actuator assembly 120 by a remote coupling 140 (i.e., a coupling enabling the transfer of energy from the remote actuator 110 to the striker actuator assembly 120). The striker actuator assembly 120 includes a mount 160 (also referred to as a drum mount) configured to couple the striker 130 to a drum 150. The striker actuator assembly 120 can include a striker mount configured to receive (e.g., releasably receive) and retain the striker 130. The striker actuator assembly 120 is configured to transition the striker 130 between a non-contact and a contact position relative to a surface of a drumhead 152 of the drum 150. The drumhead 152 may be, for example, non-vertical in orientation and facing upward or downward. Actuation of the remote actuator 110 by a user causes the remote actuator 110 to communicate with the striker actuator assembly 120 via the remote coupling 140 to cause the striker actuator assembly 120 to transition (e.g., rotate) the striker 130 into contact with the surface of the drumhead 152 to produce a sound (e.g., a percussive sound). In some embodiments, the drumhead 152 is disposed a sufficient distance from the user's foot (e.g., in a vertical and/or horizontal plane) such that a typical non-remote bass drum pedal reachable by the user's foot during use of the system 100 would not be able to contact the drumhead 152.

The remote actuator 110 can include, for example, a foot pedal actuator. In some embodiments, the foot pedal actuator may be actuated via displacing a heel portion of the foot pedal actuator and/or via displacing a toe portion of the foot pedal actuator. In some embodiments, the heel portion can be displaced to actuate a first striker actuator assembly (e.g., the striker actuator assembly 120) and the toe portion can be displaced to actuate a second striker actuator assembly (e.g., a striker actuator assembly that is the same or similar in structure and/or function to the striker actuator assembly 120 or a different striker actuator assembly via a non-remote coupling). In some embodiments, the foot pedal actuator can have three or four portions and/or actuation movements associated with three or four striker actuator assemblies, respectively (e.g., front, back, left, right, or upper left quadrant, upper right quadrant, lower left quadrant, lower right quadrant). In some embodiments, the remote actuator 110 can include one or more sensors (e.g., an accelerometer or a pressure sensor). In some embodiments, the remote actuator 110 can be configured to communicate with the striker actuator assembly 120 based on a reading of or input to the one or more sensors (e.g., to send a signal communicating how "hard" or "soft" to actuate the striker 130 by, for example, controlling a speed of actuation).

The remote coupling 140 can include any suitable remote coupling. In some embodiments, the remote coupling 140 can be mechanical (e.g., via one or more elongated members such as cables, chains, straps, and/or ropes and/or one or more cams). In some embodiments, for example, the remote coupling 140 can include a cable subassembly as described with respect to various embodiments herein. In some embodiments, for example, the remote coupling 140 can include a mechanical coupling or series of mechanical couplings (e.g., a cable subassembly or a series of cable subassemblies as described with respect to various embodiments herein) extending the entire path between the remote actuator 110 and the striker actuator assembly 120. In some embodiments, the remote coupling 140 can be electrical. In some embodiments, the remote coupling 140 can be a wired coupling or a wireless coupling. For example, the remote coupling 140 can be a wired coupling configured such that actuation signals can be transmitted via the wired coupling from the remote coupling 140 (e.g., from a sensor sensing an actuation of the remote coupling 140) to the striker actuator assembly 120 (e.g., to an electromechanical actuator of the striker actuator assembly 120). As another example, the remote coupling 140 can be a wireless coupling configured such that actuation signals can be transmitted via the wireless coupling from the remote coupling 140 (e.g., from a sensor sensing an actuation of the remote coupling 140) to the striker actuator assembly 120 (e.g., to an electromechanical actuator of the striker actuator assembly 120) via any suitable wireless communication device (e.g., one or more wireless transmitters, receivers, transceivers). The remote coupling 140 can include one or more energy transfer mechanisms as described with respect to various embodiments herein.

The striker actuator assembly 120 can include at least one actuator configured to be coupled to at least one striker. The actuator can be, for example, a mechanical actuator or an electromechanical actuator (e.g., an electromagnetic actuator). The actuator can include a linear or rotary solenoid actuator. The mount 160 of the striker actuator assembly 120 can be configured to be coupled to a drum in any suitable way. For example, in some embodiments, the mount 160 can be configured to be coupled to one or more lug screws of a drum (e.g., two, four lug screws) (also referred to as lugs). In some embodiments, the mount 160 can be configured to be coupled to a portion of a rim or hoop of a drum (e.g., via a clamp). The striker actuator assembly 120 can be configured to couple the striker 130 to a pivot or rotational joint (e.g., via a striker mount) such that the striker 130 can be pivoted or rotated relative to the drumhead 152.

In some embodiments, the mount 160 can be mounted on or near an edge of a drumhead. In some embodiments, the mount 160 can extend across the drum head (e.g., centered or off-center). For example, the mount 160 can extend from a first location on a rim of the drum to a second location on the rim of the drum, the locations, for example, disposed less than 90 degrees, at least about 90 degrees, between about 90 degrees and about 120 degrees, at least about 120 degrees, between about 120 degrees and about 150 degrees, at least about 150 degrees, between about 150 degrees and about 180 degrees, or about 180 degrees apart. The mount 160 and/or another portion of the striker actuator assembly 120 (e.g., one or more striker mounts) can be configured to receive two or more strikers 130 such that the strikers 130 extend from the mount 160 in opposite directions or the same direction and are actuatable by the striker actuator assembly 120. In some embodiments, the striker actuator assembly 120 can include more than one mount 160, with each mount 160 disposed on an edge or across a portion of the drumhead 152. In some embodiments, the mount 160 can include a floating extension portion extending from an edge of the drumhead toward a center of the drumhead. One, two, or more strikers 130 can be coupled to the floating extension portion. The strikers 130 can extend in the same or opposite directions from the floating extension portion. In some embodiments, the striker actuator assembly 120 can be configured to allow the striker 130 to swivel or rotate about the edge of the drumhead (e.g., 360 degrees) such that the striker 130 may contact a drumhead disposed at any orientation relative to the striker actuator assembly 120.

The striker 130 can include any suitable striker configured to engage with a drum head. For example, the striker 130 can include a drum beater, drum stick (disposed such that the back or the bead of the drum stick strikes the drum head), a rod, a set of rods, a soft mallet, or a brush. In some embodiments, the striker actuator assembly 120 is configured to simultaneously actuate more than one striker 130.

The system 100 can be used with any suitable drum 150. For example, the drum 150 can be a kick or bass drum, a tom drum, or a snare drum. The drum 150 can include a first drumhead on a first side of the drum 150 and a second drumhead on a second side of the drum 150 opposite the first side. In some embodiments, a striker actuator assembly 120 can be mounted to each side of the drum 150 (e.g., a first striker actuator assembly 120 mounted to a first side of the drum 150 and a second striker actuator assembly 120 mounted to a second side of the drum 150). In some embodiments, the drum 150 can be located and the striker actuator assembly 120 disposed relative to the drumhead 152 such that a user can strike the drumhead 152 with the user's hand and/or a drum stick held in the user's hand while the striker actuator assembly 120 is mounted to the drum 150. In some embodiments, rather than being used in conjunction with a drum head, the system 100 can be used to make percussive contact with any suitable percussive surface, such as a surface of a cymbal. For example, the striker actuator assembly 120 may be mounted on a stand adjacent to the cymbal, to the cymbal itself, or to the cymbal stand (e.g., to a center screw down portion of the cymbal stand). In some embodiments, the system 100 may not include the striker 130 but may be configured to be coupled with and decoupled from the striker 130 (e.g., the striker 130 may be purchased separately). In some embodiments, all or some components of the system 100 (or component variations of the system 100) can be sold separately and can be coupled together by the user as desired to function as the system 100. In some embodiments, a drum kit can include any suitable number of systems 100 (e.g., one, two, three, four, five, six, seven, eight, or more).

Figure 2:
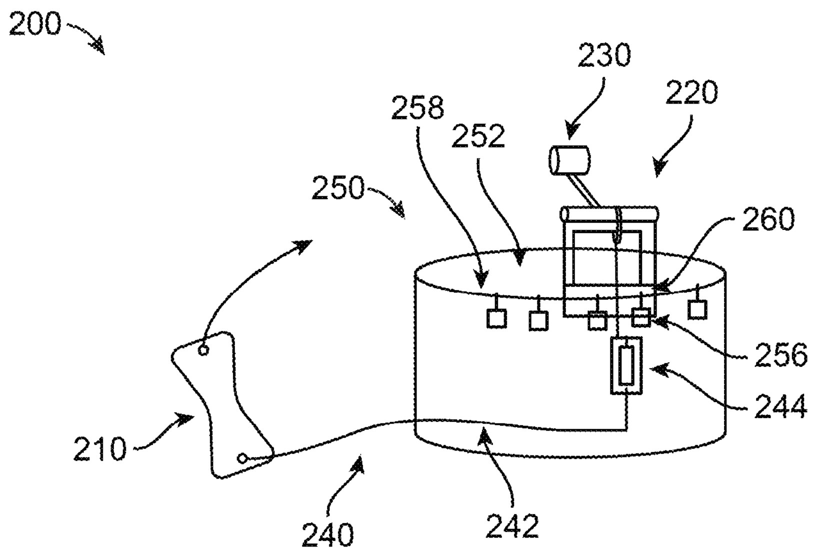
FIG. 2 is a schematic illustration of a perspective view of a system, according to an embodiment.

FIG. 2 is a schematic illustration of a system 200. The system 200 can be the same or similar in structure and/or function to the system 100 described above. The system 200 includes a remote actuator 210, a striker actuator assembly 220, and a striker 230. The remote actuator 210, the striker actuator assembly 220, and the striker 230 can be the same or similar in structure and/or function to any of the remote actuators, striker actuator assemblies, and/or strikers, respectively, described herein. The remote actuator 210 is operatively coupled to the striker actuator assembly 220 by a remote coupling 240. The striker actuator assembly 220 includes a mount 260 configured to couple the striker 230 to a drum 250. The striker actuator assembly 220 can include a striker mount configured to receive (e.g., releasably receive) and retain the striker 230. The striker actuator assembly 220 is configured to transition the striker 230 between a non-contact and a contact position relative to a surface of a non-vertical drumhead 252 of the drum 250. Actuation of the remote actuator 210 by a user causes the remote actuator 210 to communicate with the striker actuator assembly 220 via the remote coupling 240 to cause the striker actuator assembly 220 to transition (e.g., rotate) the striker 230 into contact with the surface of the non-vertical drumhead 252 to produce a sound. The drum 250 can be, for example, a kick drum disposed such that the drumhead 252 is facing upward (e.g., the drumhead 252 is disposed in a horizontal plane).

The remote actuator 210 is a pedal actuator. As shown in FIG. 2, the remote coupling 240 includes a cable 242 (also referred to as an elongated member) and an energy transfer mechanism 244. The cable 242 has a first end coupled to the remote actuator 210 and a second end coupled to the energy transfer mechanism 244. In some embodiments, the cable 242 can include a cable, chain, strap, wire, and/or rope portion. The energy transfer mechanism 244 couples the cable 242 to the striker actuator assembly 220 such that actuation of the remote actuator 210 (e.g., displacement of a heel portion of the remote actuator 210) pulls on the cable 242 and causes the energy transfer mechanism 244 to actuate the striker actuator assembly 220.

The mount 260 of the striker actuator assembly 220 can be coupled to the lugs 256 and/or the hoop 258 of the drum 250. The striker actuator assembly 220 includes an actuator configured to be coupled to the striker 230. The actuator can transition the striker 230 between a first or initial position in which the striker 230 is not in contact with the drumhead 252 as shown in FIG. 2 and a second position in which the striker contacts the drumhead 252 when the energy transfer mechanism 244 applies a force to the actuator (e.g., to a chain or cable coupled to the actuator).

Figure 3:
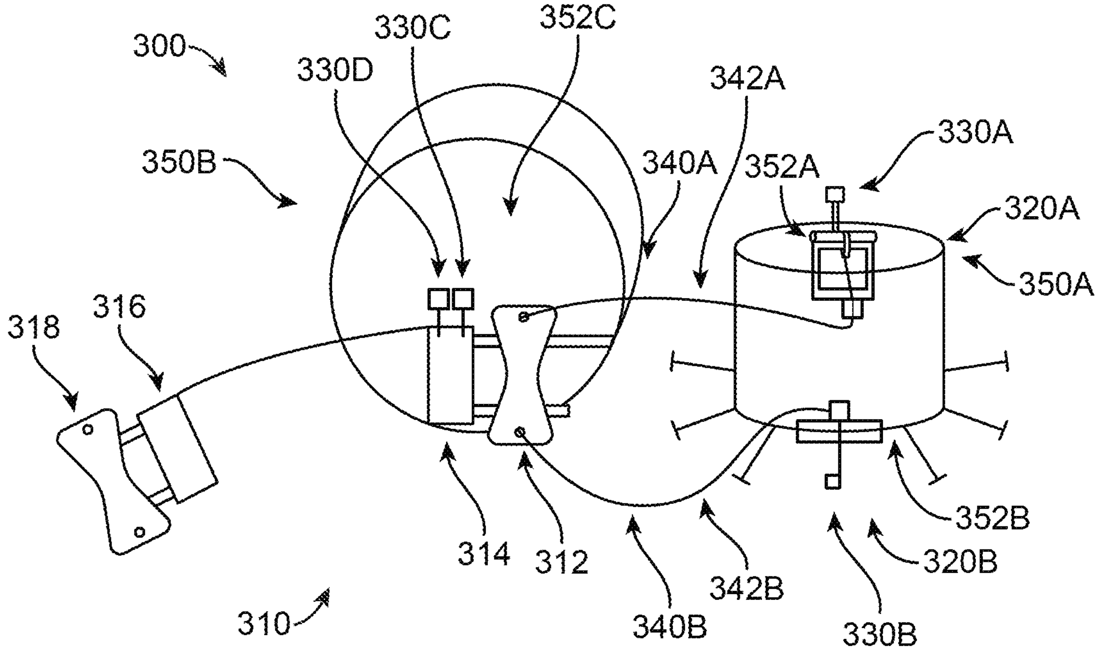
FIG. 3 is a schematic illustration of a perspective view of a system, according to an embodiment.

FIG. 3 is a schematic illustration of a system 300 including two drums (i.e., a first drum 350A and a second drum 350B). The first drum 350A can include a first drumhead 352A and a second drumhead 352B on an opposite side of the first drum 350A from the first drumhead 352A. The first drum 350A can be oriented such that the first drumhead 352A and the second drumhead 352B are disposed in parallel horizontal planes relative to the surface on which the drum 350A sits. The second drum 350B can include a drumhead 352C that is vertically oriented (e.g., disposed in a vertical plane relative to the surface on which the second drum 350B sits).

The system 300 includes a first striker actuator assembly 320A and a second striker actuator assembly 320B mounted on the first drum 350A. The first striker actuator assembly 320A is mounted on the first drum 350A such that the first striker actuator assembly 320A can transition (e.g., rotate) a striker 330A into percussive contact with the first drumhead 352A and out of contact with the first drumhead 352A. The second striker actuator assembly 320B is mounted on the second drum 350B such that the second striker actuator assembly 320B can transition (e.g., rotate) a striker 330B into percussive contact with the second drumhead 352B and out of contact with the second drumhead 352B.

The system 300 includes a remote actuator assembly 310 that includes a first pedal actuator 312, a second pedal actuator 314, a third pedal actuator 316, and an optional fourth pedal actuator 318. The first pedal actuator 312 is coupled to the first striker actuator assembly 320A via a remote coupling 340A including a first cable 342A and to the second striker actuator assembly 320B via a second remote coupling 340B including a second cable 342B. The first pedal actuator 312 is configured such that a first actuation movement of the first pedal actuator 312 (e.g., displacement of a toe portion of the first pedal actuator 312) causes actuation of the first striker actuator assembly 320A to transition the first striker 330A into percussive contact with the first drumhead 352A and a second actuation movement of the first pedal actuator 312 (e.g., displacement of a heel portion of the first pedal actuator 312) causes actuation of the second striker actuator assembly 320B to transition the second striker 330B into percussive contact with the second drumhead 352B. In some embodiments, the first striker actuator assembly 320A and the second striker actuator assembly 320B can be configured to retain the first striker 330A and the second striker 330B, respectively, in a non-contact position relative to the first drumhead 352A and the second drumhead 352B when the first pedal actuator 312 is not being held in an actuated configuration (e.g., pressed on with a first actuation movement or a second actuation movement). For example, in some embodiments, when a toe portion of the pedal of the first pedal actuator 312 is released, the first striker actuator assembly 320A can return to a non-contact configuration to which the first striker actuator assembly 320A is biased such that a striking end of the striker 330A is spaced from the first drumhead 352A. In some embodiments, when a heel portion of the pedal of the first pedal actuator 312 is released, the second striker actuator assembly 320B can return to a non-contact configuration to which the second striker actuator assembly 320B is biased such that a striking end of the striker 330B is spaced from the second drumhead 352B.

The first pedal actuator 312 and the second pedal actuator 314 can be mounted to the second drum 350B (e.g., coupled to a rim of the second drum 350B). For example, the second pedal actuator 314 can be coupled to the drum 350B via a support frame and/or mounting component of the first pedal actuator 312. In some embodiments, alternatively or in addition to the first pedal actuator 312 being mounted directly to the second drum 350B, the second pedal actuator 314 can be coupled to the drum 350B via a mounting component (e.g., a hoop clamp) (e.g., at a bottom center location of the drum 350B). The first pedal actuator 312 can be coupled to the second drum 350B via the second pedal actuator 314. The second pedal actuator 314 can be configured to be actuated (e.g., via displacement of a heel or toe portion of the second pedal actuator 314) to transition (e.g., rotate) a third striker 330C into percussive contact with the third drumhead 352C. The second pedal actuator 314 can be biased toward a configuration in which the third striker 330C is not in contact with the third drumhead 352C such that, when the second pedal actuator 314 is released from the actuation configuration, the second pedal actuator 314 transitions the striking end of the third striker 330C away from the third drumhead 352C.

The third pedal actuator 316 can be coupled to the second pedal actuator 314 such that actuation of the third pedal actuator 316 (e.g., via displacement of a heel or two portion of the third pedal actuator 316) causes a fourth striker 330D to transition (e.g., rotate) into percussive contact with the third drumhead 352C. The third pedal actuator 316 can be biased toward a configuration in which the fourth striker 330D is not in contact with the third drumhead 352C such that, when the third pedal actuator 316 is released from the actuation configuration, the third pedal actuator 316 transitions the striking end of the fourth striker 330D away from the third drumhead 352C. The first pedal actuator 312 and the second pedal actuator 314 can be disposed facing the third drumhead 352C, with both the third striker 330C and the fourth striker 330D disposed between the second pedal actuator 314 and the drumhead 352C. The third pedal actuator 316 can be disposed a distance from the second pedal actuator 314 such that the third pedal actuator 316 is not facing the third drumhead 352C and such that a user may actuate the third pedal actuator 316 with his left foot and may actuate the first pedal actuator 312 and/or the second pedal actuator 314 with his right foot. The optional fourth pedal actuator 318 can be optionally operatively coupled to one or more additional drums (not shown) in a similar manner as described with respect to the first actuator 312 and/or in a similar manner as described with respect to any of the embodiments herein.

Figure 4:
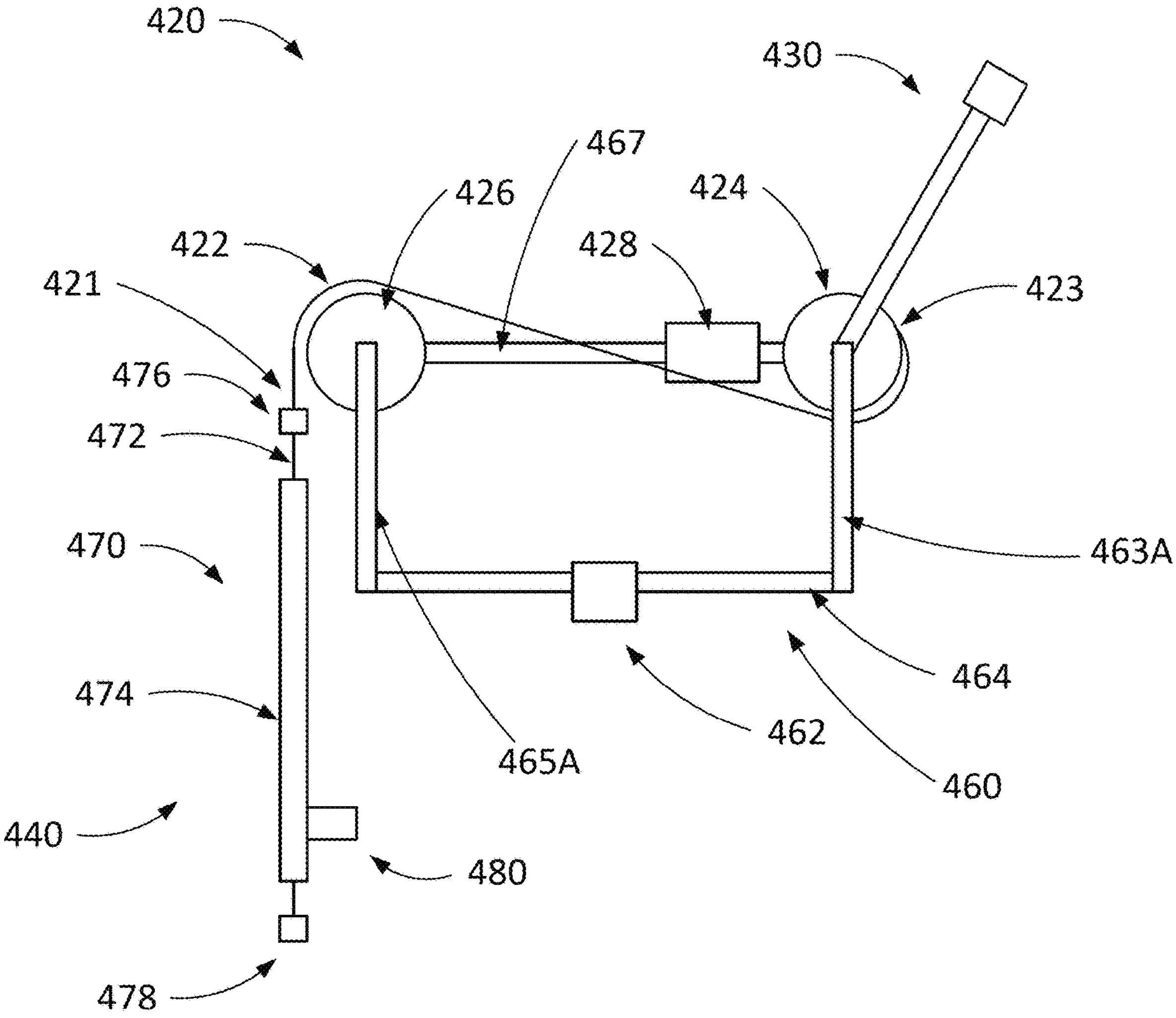
FIG. 4 is a schematic illustration of a side view of a system, according to an embodiment.
Figure 5:
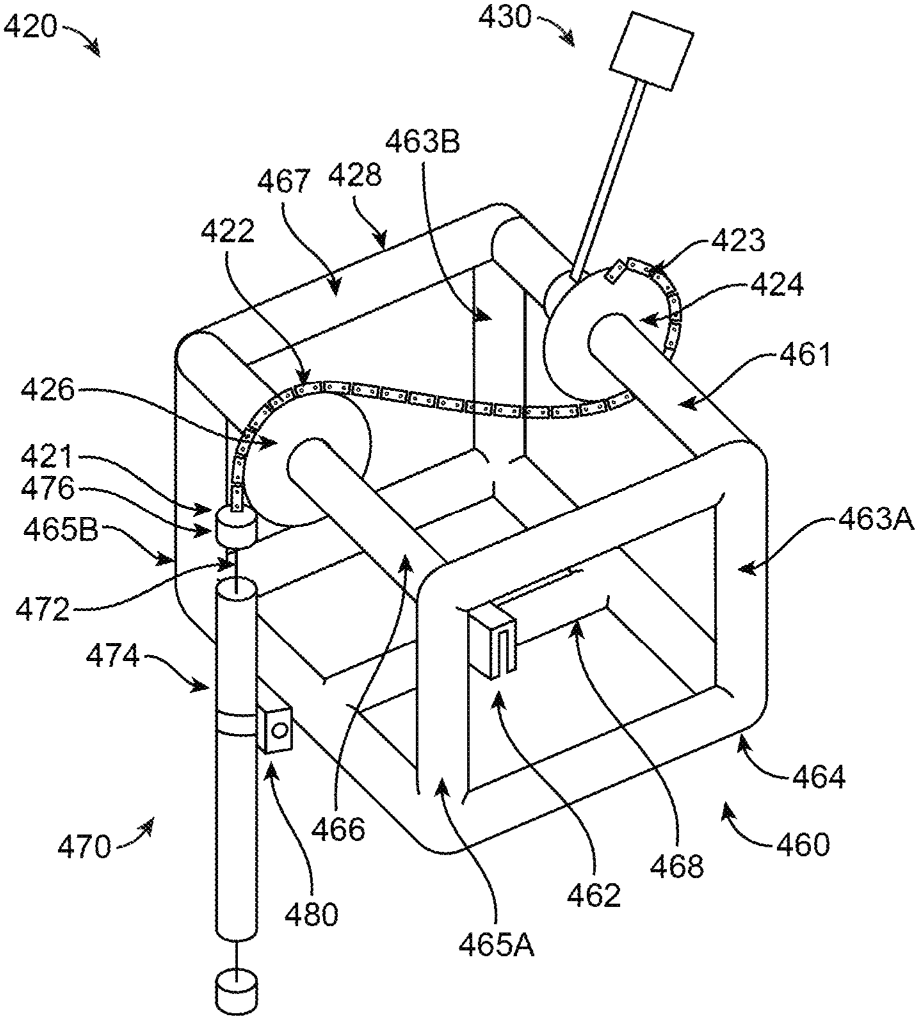
FIG. 5 is a schematic illustration of a perspective view of the system of FIG. 4.

FIGS. 4 and 5 are schematic illustrations of a side view and a perspective view of a striker actuator assembly 420. The striker actuator assembly 420 can be the same or similar in structure and/or function to any of the striker actuator assemblies described herein. For example, the striker actuator assembly 420 includes a mount 460. The mount 460 includes a base frame 464 and a crossbar 468 extending between two segments of the base frame 464. The mount 460 can be coupled to a drum rim or hoop or via a clamp 462 coupled to the crossbar 468. The striker actuator assembly 420 also includes four post members coupled to or included in the base frame 464, including a first post member 463A, a second post member 463B, a third post member 465A, and a fourth post member 465B. A first rotatable crossbar 461 has a first end coupled to the first post member 463A via a first ball bearing and a second end coupled to the second post member 463B via a second ball bearing such that the first rotatable crossbar 461 can be rotated about a central axis of the first rotatable crossbar 461. A second rotatable crossbar 466 has a first end coupled to the third post member 465A via a first ball bearing and a second end coupled to the fourth post member 465B via a second ball bearing such that the second rotatable crossbar 466 can be rotated about a central axis of the second rotatable crossbar 466. The second post member 463B can be coupled to the fourth post member 465B via a spring 428 and a rigid extension member 467 (or alternatively, via only a spring 428). In some embodiments, although not shown, the spring 428 may be coupled directly to the second post member 463B and the fourth post member 465B. The spring 428 can be coupled to the first rotatable crossbar 461 such that rotation of the first rotatable crossbar 461 from a first position to a second position causes the spring 428 to transition from a neutral configuration to an energized configuration (e.g., a stretched or compressed configuration) such that when the first rotatable crossbar 461 is not under tension, it returns under the spring force of the spring 428 to the first configuration. Although not shown, in some embodiments a second spring can be coupled to the second rotatable crossbar 466 to cause the second rotatable crossbar 466 to transition from an energized configuration to a neutral configuration when the second rotatable crossbar 466 is not under tension (e.g., from the cable subassembly 470 as described below).

The striker actuator assembly 420 also includes a first cam 424, a second cam 426, and a chain 422 (also referred to as an elongated member). The first cam 424 is fixedly coupled to the first rotatable crossbar 461 and the second cam 426 is fixedly coupled to the second rotatable crossbar 466. A first end 423 of the chain 422 is configured to be fixedly coupled to a portion of the first cam 424 such that applying a force on the chain 422 away from the first cam 424 causes the first cam 424 and the first rotatable crossbar 461 to rotate. The chain 422 is disposed along an underside of the first cam 424 and along the top surface of the second cam 426 such that pulling downward on the second end 421 of the chain 422 rotates the second cam 426 and second rotatable crossbar 466 in a first direction and rotates the first cam 424 and first rotatable crossbar 461 in a second direction opposite the first direction. In some embodiments, one or more portions of the chain 422 can be fixedly coupled to one or more portions of the second cam 426. In some embodiments, the first coupling element 476 of the cable subassembly 470 (described below) can be fixedly coupled to a portion of the second cam 426 (e.g., via being screwed in at a lock tie down on the second cam 426). In some embodiments, the second cam 426 can include a set of teeth on a perimeter of the second cam 426 and configured to engaged with respective links of the chain 422. A striker 430, which can be the same or similar in structure and/or function to any of the strikers described herein, is coupled to the first cam 424 such that rotation of the first cam 424 causes the striker 430 to rotate (e.g., between a non-contact and a contact configuration relative to a drumhead). The striker 430 can be coupled to the first cam 424 via, for example, a releasable striker mount including any suitable coupling mechanism (e.g., one or more tightening knobs, one or more latches or levers, any of the coupling mechanisms described herein). In some embodiments, rather than the second cam 426 being fixedly coupled to the second rotatable crossbar 466 and the second rotatable crossbar 466 being rotatable, the second cam 426 can be configured to rotate relative to the crossbar 466 under the control of the chain 422. Although the chain 422 is referred to as a chain, the chain 422 can be formed as or include a single chain, a double chain, a strap, a cable, a rope, or any other suitable connection line.

As shown in FIG. 4, the second end 421 of the chain 422 can be coupled to a remote coupling 440 including a cable subassembly 470. The cable subassembly 470 can include a cable 472, a first coupling element 476 coupled to a first end of the cable 472, a second coupling element 478 coupled to a second end of the cable 472, and a sheath 474 (e.g., a flexible sheath) defining a lumen within which a portion of the cable 472 is disposed. The first coupling element 476 can be configured to be coupled with the second end 421 of the chain 422. The second coupling element 478 can be configured to be coupled to a remote actuator, such as any of the remote actuators described herein, such that the cable 472 can be pulled and released by the remote actuator. The cable subassembly 470 can be configured to be coupled to a portion of a drum and/or to the base frame 464 of the mount 460 via a cable mount 480. In some embodiments, the cable subassembly 470 can be configured to be coupled to another component of a system or kit, such as a drum stand, another drum, and/or another stand.

Figure 6:
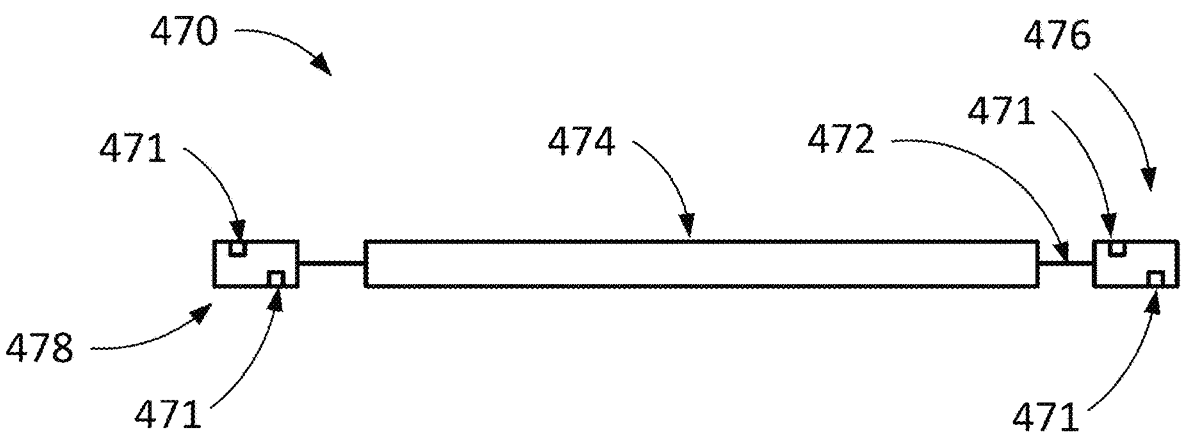
FIG. 6 is a schematic illustration of a cable subassembly of the system of FIG. 4.

FIG. 6 is a schematic illustration of the cable subassembly 470 of the striker actuator assembly 400. As shown in FIG. 6, each of the first coupling element 476 and the second coupling element 478 define engagement features 471 (e.g., openings) configured to receive complementary engagement elements (e.g., screws) for secure coupling of the first coupling element 476 and the second coupling element 478 to other components.

Figure 7:
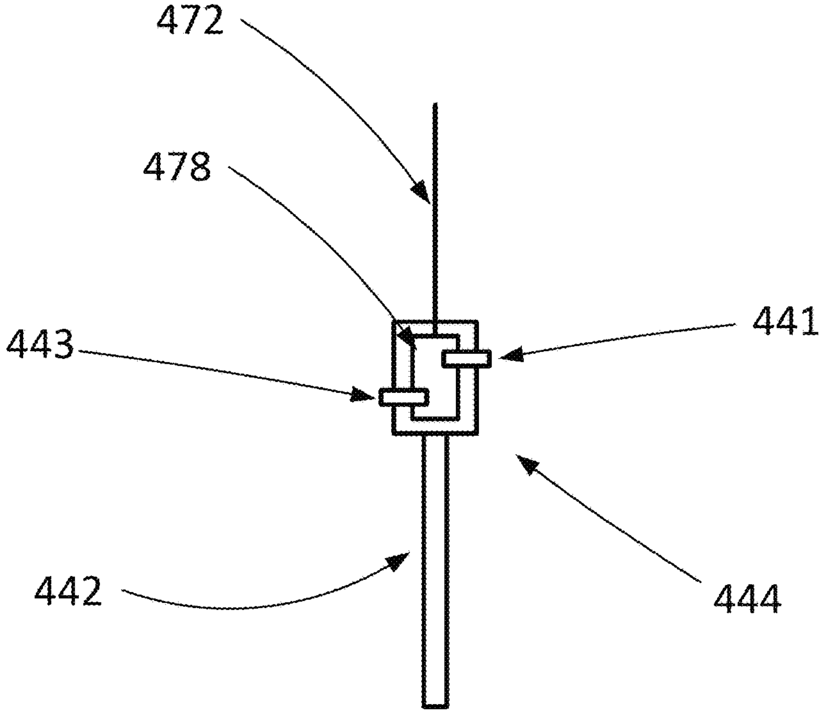
FIG. 7 is a schematic illustration of a portion of the system of FIG. 4.

FIG. 7 is a schematic illustration of an energy transfer mechanism 444 of a remote actuator 410 engaged with a portion of the cable subassembly 470. As shown, the second coupling element 478 is configured to be received within an interior of the energy transfer mechanism 444. A first screw 441 is selectively engaged with a first engagement feature 471 and a second screw 443 is selectively engaged with a second engagement feature 471 through a housing of the energy transfer mechanism 444 to secure the second coupling element 478 to the energy transfer mechanism 444. Thus, movement of a chain 442 of the remote actuator 410 can cause corresponding movement of the cable 472 via the energy transfer mechanism 444.

Figure 8A:
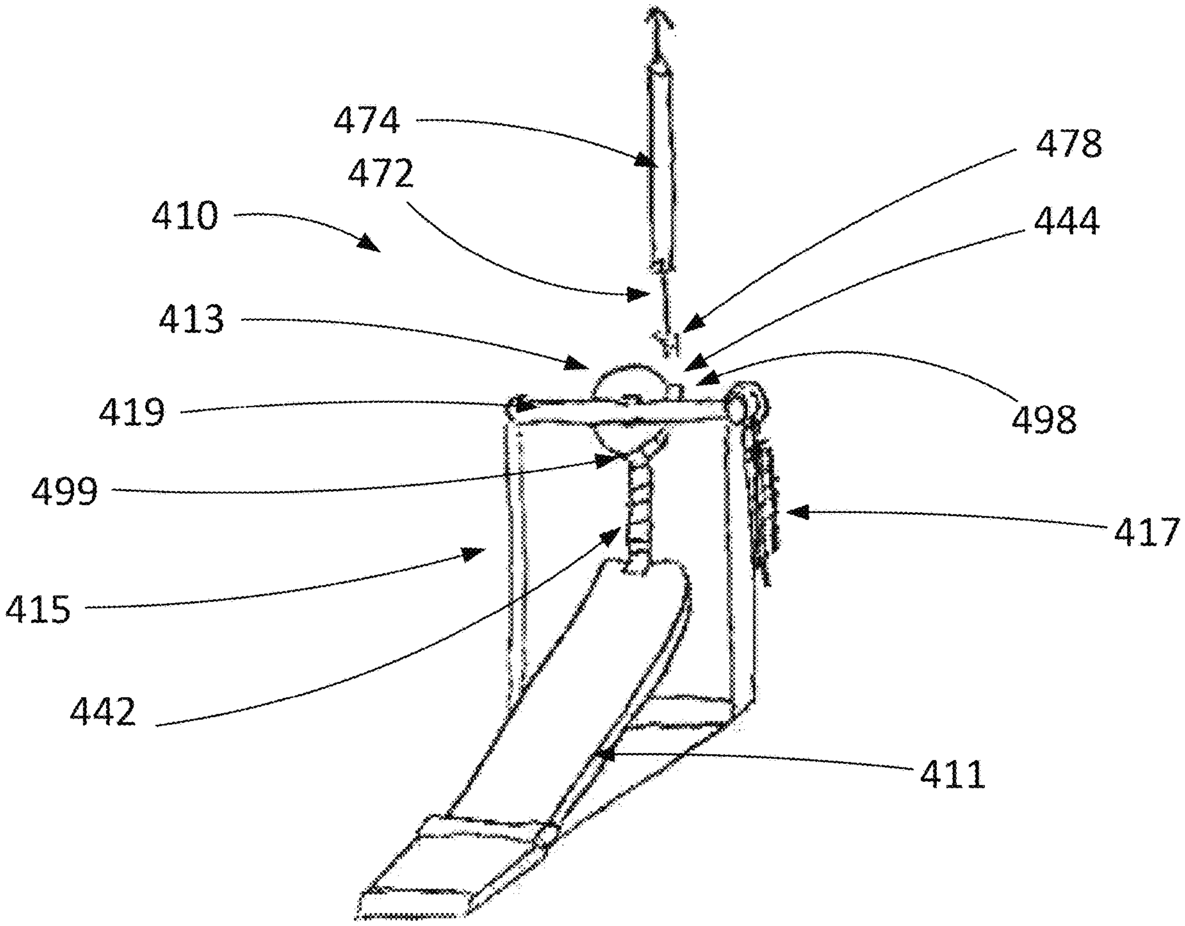
FIG. 8A is a schematic illustration of a remote actuator of the system of FIG. 4.

FIG. 8A is a schematic illustration of a remote actuator 410 and the cable subassembly 470. As shown, the remote actuator 410 includes a pedal 411, a chain 442, a cam 413, a cam support 415, a spring 417, a rotatable crossbar 419, and an energy transfer mechanism 444. The rotatable crossbar 419 is supported by the cam support 419 and rotatable relative to supporting posts of the cam support 419 (e.g., via ball bearings disposed on the ends of the rotatable crossbar 419) such that the rotatable crossbar 419 can be rotated about a central axis of the rotatable crossbar 419. A first end of the spring 417 can be coupled to the rotatable crossbar 419 and the second end of the spring 417 can be coupled to a fixed position (e.g., on the cam support 415) such that rotation of the rotatable crossbar 419 from a first position to a second position (e.g., due to a user's foot pressing against the pedal 411 as described further below) causes the spring 417 to transition from a neutral configuration to an energized configuration (e.g., a stretched or compressed configuration). When the rotatable crossbar 419 is no longer under tension in the second position (e.g., when a user's foot is lifted away from the pedal 411 such that the pedal 411 is released), the rotatable crossbar 419 returns under the spring force of the spring 417 to the first position.

The cam 413 is fixedly coupled to the rotatable crossbar 419 such that rotation of the rotatable crossbar 419 causes rotation of the cam 413. The chain 442 has a first end coupled to the energy transfer mechanism 444 and a second end coupled to the pedal 411. As shown in FIG. 8A, a first portion 499 of the chain 442 (e.g., a link) can be fixedly attached to a first location on the cam 413 and a second portion 498 of the chain 442 (e.g., a link) can be fixedly attached to a second location on the cam 413. The portion of the chain 442 disposed along the perimeter of the cam 413 is disposed on an opposite side of the cam 413 relative to the pedal 411. Thus, depressing the pedal 411 pulls on the second end of the chain 442 and causes the cam 413 to transition from a first position to a second position (shown in FIG. 8A). When the energy transfer mechanism 444 is coupled to the second coupling element 478 of the cable subassembly 470, depression of the pedal 411 causes the portion of the chain between the first portion 499 and the pedal 411 to be pulled downward, causing rotation of the cam 413. Rotation of the cam 413 causes the first end of the chain 442 to be pulled downward by rotating the portion of the chain 442 disposed around the cam 413. Pulling the first end of the chain 442 downward causes the cable 472 to be translated relative to the sheath 474 (e.g., downward through the sheath 474), actuating the striker actuator assembly 420 to transition the striker 430 between a non-contact configuration and contact configuration relative to a drumhead if the first coupling element 476 is coupled to the second end 421 of the chain 442 and the striker actuator assembly 420 is mounted to a drum. Thus, actuation of the pedal 411 causes actuation of the striker actuator assembly 420 when the remote actuator 410 is coupled to the striker actuator assembly 420 via the cable assembly 470. Conversely, releasing the pedal 411 can cause the striker actuator assembly 420 to transition the striker 430 from a contact configuration to a non-contact configuration relative to the drumhead.

Figure 8B:
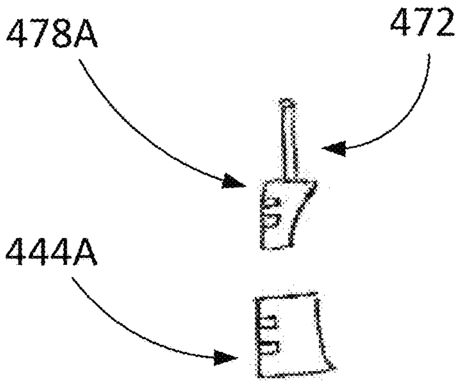
FIG. 8B is a schematic illustration of a portion of the cable subassembly of the system of FIG. 4 and an energy transfer mechanism of the system of FIG. 4, according to an embodiment.

FIG. 8B is a schematic illustration of a second coupling element 478A of a cable subassembly 470A and an energy transfer mechanism 444A, according to an embodiment. The second coupling element 478A, the cable subassembly 470A, and the energy transfer mechanism 444A can be the same or similar in structure and/or function to the second coupling element 478, the cable subassembly 470, and the energy transfer mechanism 444 and will be described relative to other components of the system 400. For example, the cable subassembly 470A includes the sheath 474, the cable 472, a first coupling element 476A, and the second coupling element 478A.

Figure 8C:
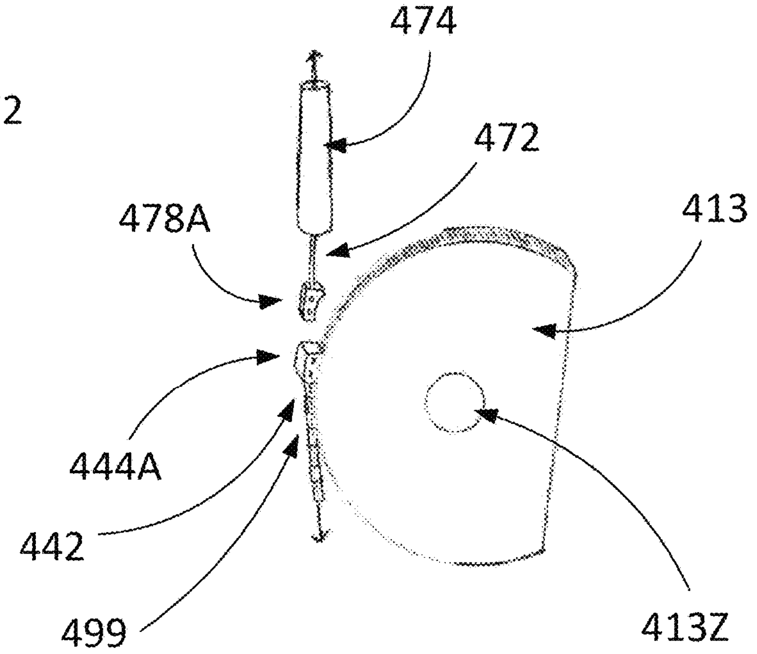
FIG. 8C is a schematic illustration of a portion of the cable subassembly of the system of FIG. 4 and a portion of the remote actuator of the system of FIG. 4, according to an embodiment.
Figure 8D:
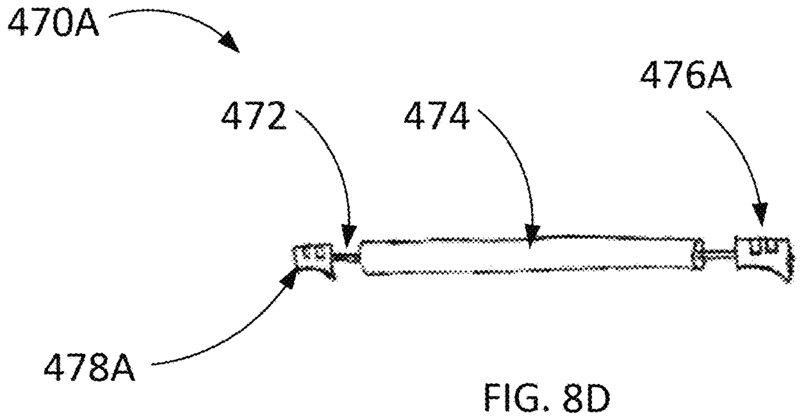
FIG. 8D is a schematic illustration of a cable subassembly, according to an embodiment.

The energy transfer mechanism 444 can be configured to receive the second coupling element 478A such that engagement features of the second coupling element 478A and of the energy transfer mechanism 444 align and can each receive a complementary engagement element (e.g., a screw) to secure the second coupling element 478A to the energy transfer mechanism 444. As shown in FIG. 8C, each of the second coupling element 478A and the energy transfer mechanism 444A can have a curved perimeter portion shaped to complement an outer surface of the cam 413 that the second coupling element 478A and the energy transfer mechanism 444A contact.

Figure 36:
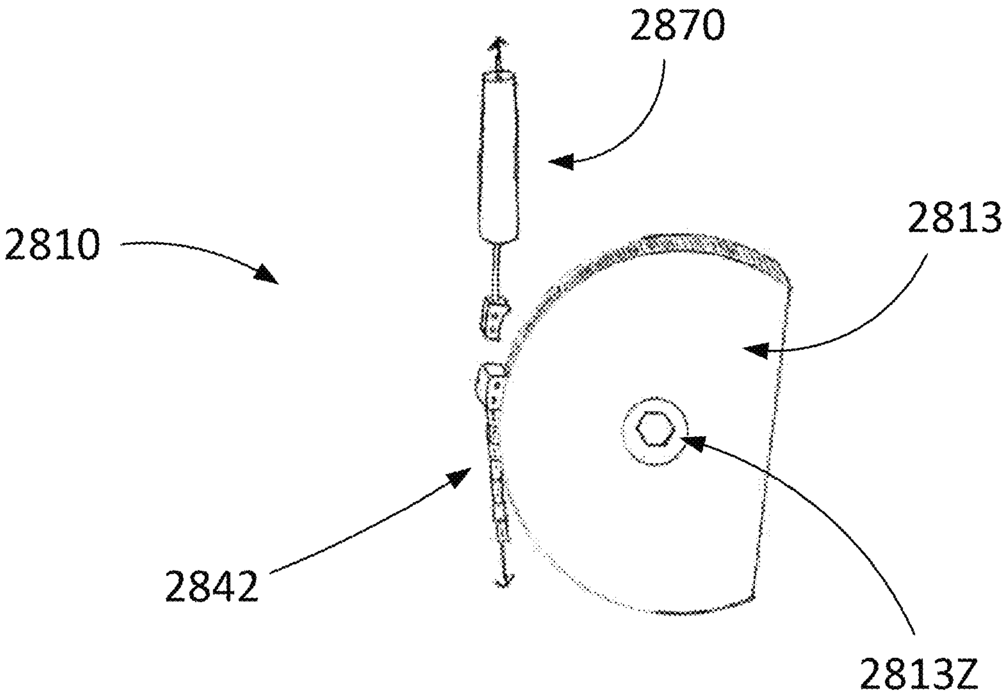
FIG. 36 is a schematic illustration of a portion of a cable subassembly and a portion of a remote actuator, according to an embodiment.
Figure 37:
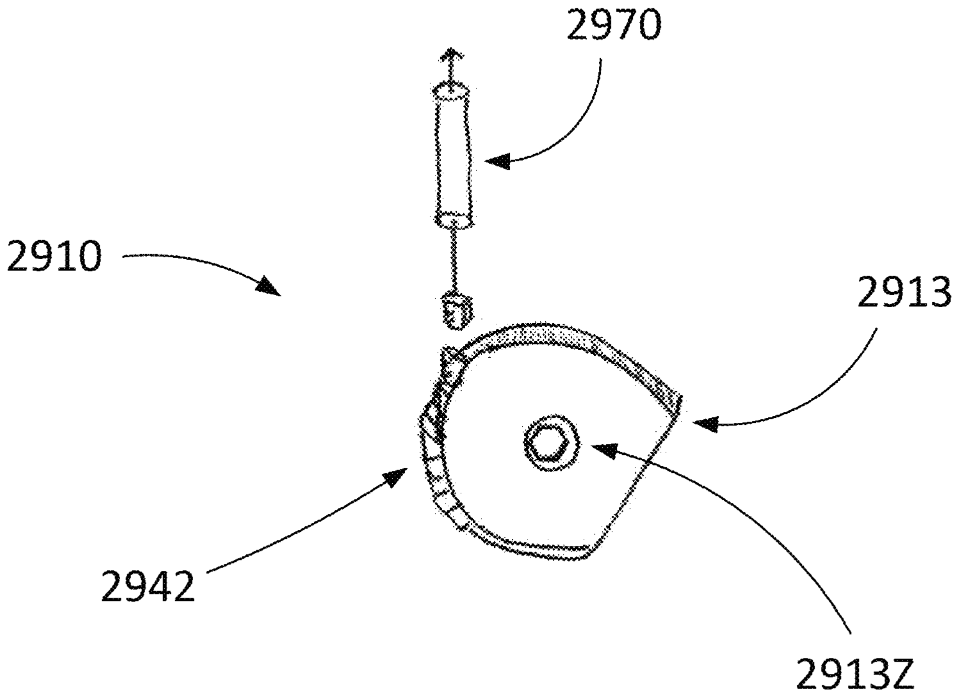
FIG. 37 is a schematic illustration of a portion of a cable subassembly and a portion of a remote actuator, according to an embodiment.

Additionally, as shown in FIG. 8C, the cam 413 can define an opening 413Z extending through the cam 413 configured to receive the rotatable crossbar 419. The cam 413 can be coupled to the rotatable crossbar 419 such that the cam 413 is fixed relative to the crossbar 419 and does not rotate relative to the crossbar 419 in any suitable way. For example, in some embodiments, the cam 413 can be coupled to the crossbar 419 via an adhesive or welding. In some embodiments, the opening 413Z can have a shape corresponding to a cross-sectional shape of the crossbar 419 such that rotation of the cam 413 causes rotation of the crossbar 419 and vice versa. The shape of the opening and the cross-sectional shape of the crossbar 419 can be, for example, square, ovular, hexagonal, triangular, octagonal, or any other suitable shape. For example, FIG. 36 is a schematic illustration of a portion of a cable subassembly 2870 and a portion of a remote actuator 2810 that can be the same or similar in structure and/or function to any of the cable subassemblies and remote actuators described herein. For example, the remote actuator 2810 includes a cam 2813 and a chain 2842. The cam 2813 defines a hexagonal-shaped opening 2813Z shaped to receive a rotatable crossbar having a hexagonal cross-section (e.g., a hex bar) such that rotation of the cam 2813 causes rotation of the crossbar 2819 and vice versa. As another example, FIG. 37 is a schematic illustration of a portion of a cable subassembly 2970 and a portion of a remote actuator 2910 that can be the same or similar in structure and/or function to any of the cable subassemblies and remote actuators described herein. For example, the remote actuator 2910 includes a cam 2913 and a chain 2942. The cam 2913 defines a hexagonal-shaped opening 2913Z shaped to receive a rotatable crossbar having a hexagonal cross-section (e.g., a hex bar) such that rotation of the cam 2913 causes rotation of the crossbar 2919 and vice versa. As shown, the cam 2913 has a smaller diameter than the cam 2813 in FIG. 36. The cam 2913 (and any of the cams described herein) can have any suitable diameter or maximum lateral extent such that more or less rotation of the cam 2913 causes an intended effect (e.g., distance of translation of an elongated member of the cable subassembly or distance or speed of movement of a striker coupled to a cam).

In some embodiments, a crossbar, such as any of the crossbars described herein, can be coupled to a cam, such as any of the cams described herein (e.g., the cam 413), via inserting an end of the crossbar into a corresponding recess of the cam. The recess and the cross-section of the end of the crossbar can have corresponding shapes, such as an ovular, hexagonal, triangular, octagonal, or any other suitable shape allowing the crossbar and the cam to be rotationally fixed. In some embodiments, a rotatable crossbar, such as the crossbar 419, can be formed of multiple segments, with a segment fixedly coupled to each side of the cam (via, for example, corresponding male and female shapes, threads, adhesive, and/or welding). In some embodiments, a cam can be coupled to a crossbar for fixed rotation via a screw.

Figure 8E:
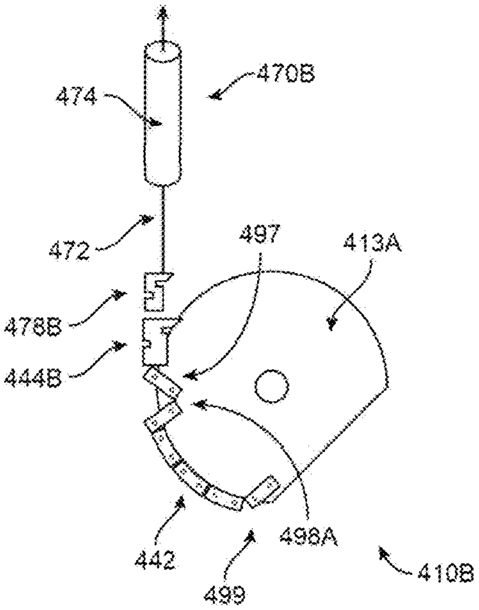
FIG. 8E is a schematic illustration of a portion of a cable subassembly and a portion of a remote actuator, according to an embodiment.

In some embodiments, the chain 442 can be formed entirely or almost entirely of chain links. In some embodiment, only a portion of the chain 442 can be formed of chain links. For example, a portion of the chain 442 can be formed of cable, a strap, and/or rope. In some embodiments, the chain 442 can be formed of separate portions coupled to one another directly and/or via the cam 413. For example, FIG. 8E is a schematic illustration of a portion of a remote actuator 410B and a portion of a cable subassembly 470B. The cable subassembly 470B includes the cable 472, the sheath 474, and second coupling element 478B that can be the same or similar in structure and/or function to any of the second coupling elements described herein. The remote actuator 410B includes an energy transfer mechanism 444B that can be similar to any of the energy transfer mechanisms described herein, such as the energy transfer mechanism 478A. The energy transfer mechanism 444B can be coupled to a first fixed location 497 on a cam 413A that can be the same or similar in structure and/or function to any of the cams described herein. The chain 442 can have a first end coupled to a second fixed location 498A on the cam 413A and a second end coupled to the third fixed location 499 on the cam 413A. As shown in FIG. 8E, unlike in FIG. 8B, the second coupling element 478B and the energy transfer mechanism 444B can have engagement features on opposite sides of the second coupling element 478B and the energy transfer mechanism 444B rather than the same side.

Figure 8F:
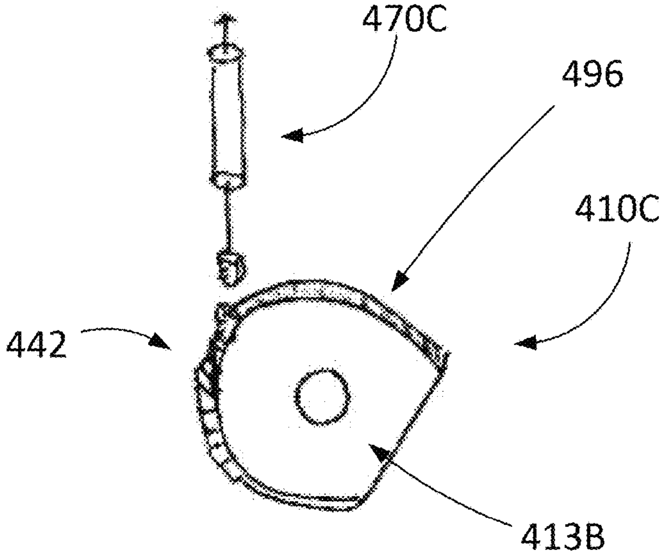
FIG. 8F is a schematic illustration of a portion of a cable subassembly and a portion of a remote actuator, according to an embodiment.

In some embodiments, a cam of a remote actuator can include a composite lining portion configured to reduce noise (e.g., the sound of the chain 442 or the cable 472 contacting the cam 413). For example, FIG. 8F shows a schematic illustration of a portion of a remote actuator 410C and a portion of a cable subassembly 470C. The remote actuator 410C and the cable subassembly 470C can be the same or similar in structure and/or function to any of the remote actuators and cable subassemblies described herein. The remote actuator 410C includes a cam 413B having a composite portion 496 disposed around a perimeter of the cam 413 where the chain 442 and/or the cable 472 can contact the cam 413. In some embodiments, the composite portion 496 can be formed of a material the same or different from a remaining portion of the cam 413. In some embodiments, the composite portion 496 can be configured such that the sound generated from contact between the cable 472 and/or the chain 442 and the composite portion 496 is reduced compared to sound generated from contact between the cable 472 and/or the chain 442 and the cam 413 if the composite portion 496 were not included. In some embodiments, the composite portion 496 can include any suitable composite material that is sufficiently durable to withstand wear caused by an elongated member (e.g., the chain 442 or the cable 472) contacting the cam 413 over a period of repeated use of the system 400. In some embodiments, the composite portion 496 can include a semi-hard material. In some embodiments, the composite portion 496 can include a synthetic material. In some embodiments, the composite portion 496 can include a replaceable lining configured to be exchanged for a new lining after a period of repeated use of the system 400. In some embodiments, the composite portion 496 can include at least one of leather, canvas, or suede. Although not shown, in some embodiments any of the cams described herein can define a channel in at least a portion of the outer perimeter of the cam 413 to maintain the cable 442 within the channel during operation of the remote actuator including the cam 413. In some embodiments, any of the cams described herein can include a composite portion as described with respect to the composite portion 496 and/or can define a channel as described with respect to cam 413. For example, the cams of any of the remote actuators or the striker actuator assemblies described herein can include one or more composite portions to reduce or eliminate audible sound resulting from contact between an elongated member such as a chain or cable and the surface of the cam.

Figure 8G:
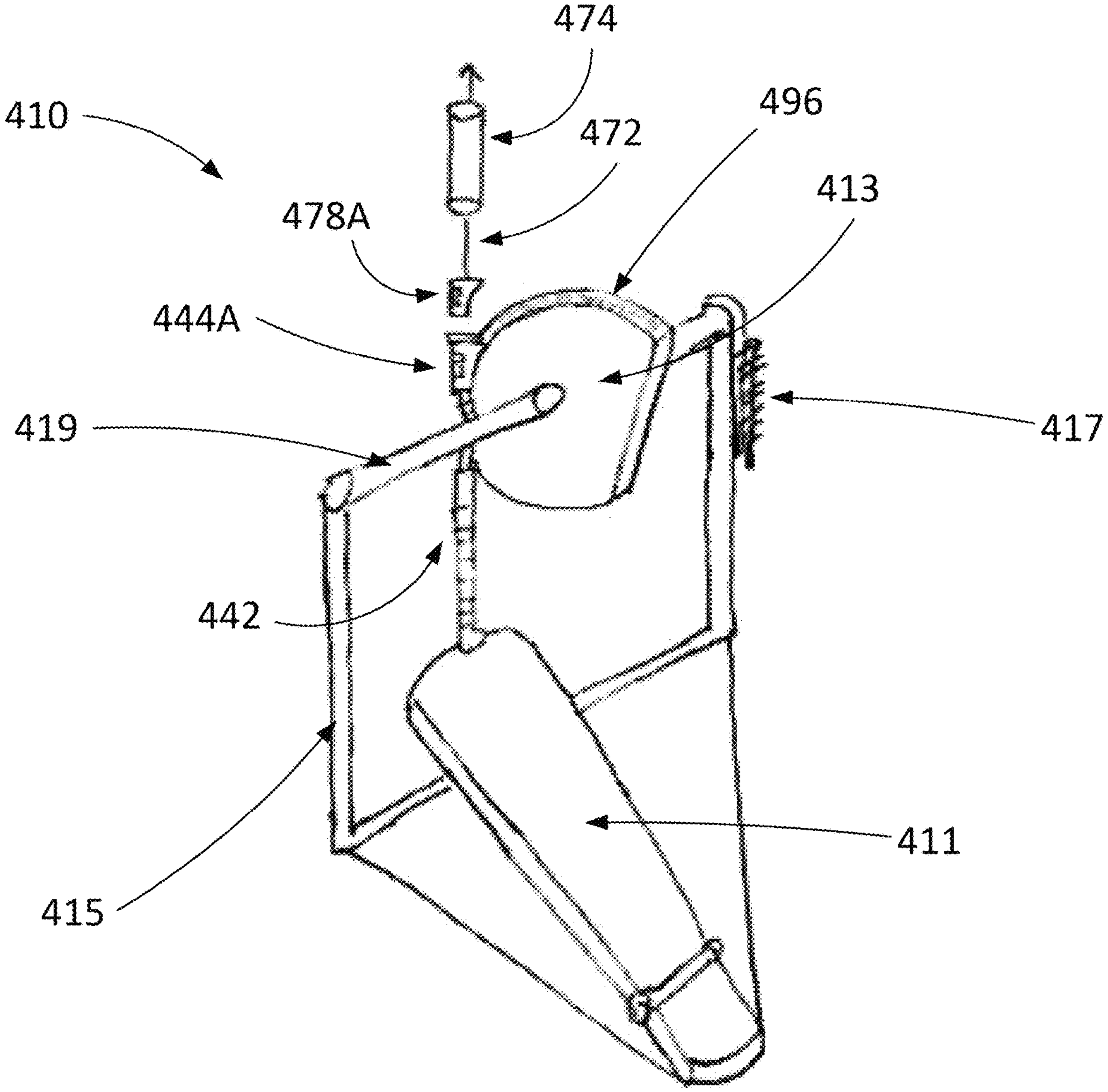
FIG. 8G is a schematic illustration of a remote actuator, according to an embodiment.

FIG. 8G shows an alternative arrangement of the remote actuator 410 in which the energy transfer mechanism 444A is fixedly coupled to a location on the perimeter of the cam 413 and the chain 442 extends directly from the location on the cam 413 to the pedal 411 (e.gs., without being coupled to a second location on the perimeter of the cam 413). Thus, the travel motion of the energy transfer mechanism 444A follows the motion of the outer surface of the cam 413 (e.g., downward when the pedal 411 is depressed and upward when the pedal 411 is released). As described above with respect to FIG. 8F, the 413 can include the composite portion 496 disposed about the perimeter of the cam 413 where the chain 442 and/or cable 472 may contact the cam 413 to reduce noise resulting from the contact.

Figure 9:
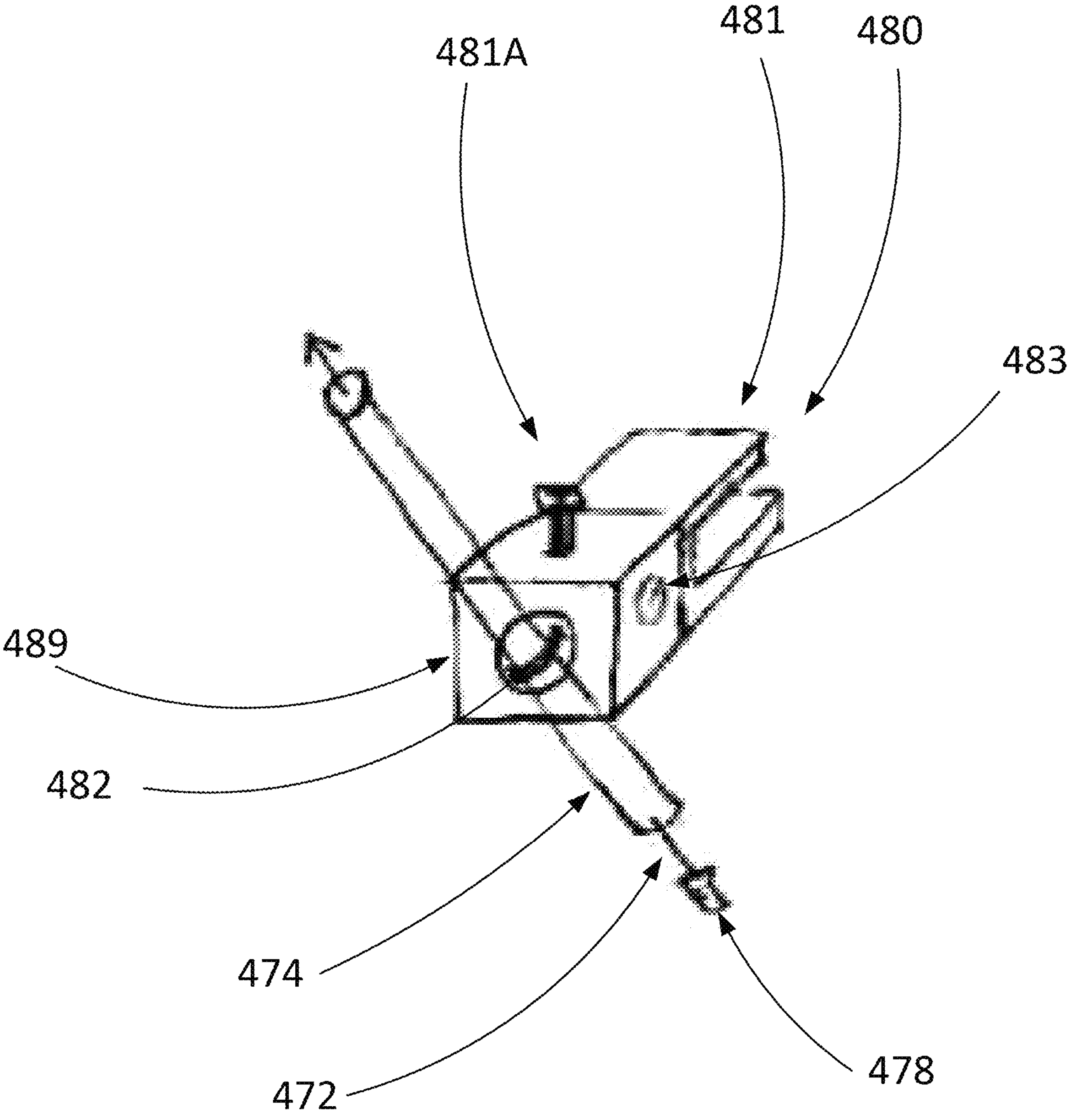
FIG. 9 is a schematic illustration of a cable mount of the system of FIG. 4.

FIG. 9 is a schematic illustration of a cable mount 480 configured to mount a portion of the cable subassembly 470 to a drum (not shown) (e.g., to a hoop or rim of a drum). The cable mount 480 includes a mounting assembly 481 including a first thumb tightening knob 481A. The thumb tightening knob 481A can be advanced to tighten a portion of a drum (e.g., a hoop or rim) against one of the two opposing brackets of the mounting assembly 481. The cable mount 480 can include a tubular portion or strap 482 (e.g., a tubular portion having a pinch point on each end) configured to engage the sheath 474 of the cable subassembly 470 such that the sheath 474 is immovable relative to the tubular portion or strap 482 but the cable 472 is translatable through the sheath 474. The cable mount 480 also includes a second tightening knob 483 (e.g., a thumb tightener) configured to be advanced to releasably engage with a rotatable component (not shown) coupled to the tubular portion or strap 482 and extending into the housing 489 of the cable mount 480 to set an angular position of the tubular portion or strap 482 relative to the housing 489 such that the sheath 474 is directed in a particular angular direction relative to the housing 489 by the tubular portion or strap 482. In some embodiments, the cable mount 480 can be configured such that the tubular portion or strap 482 can rotate 360 degrees relative to a central axis of the rotatable component disposed within the housing 489.

Figure 33:
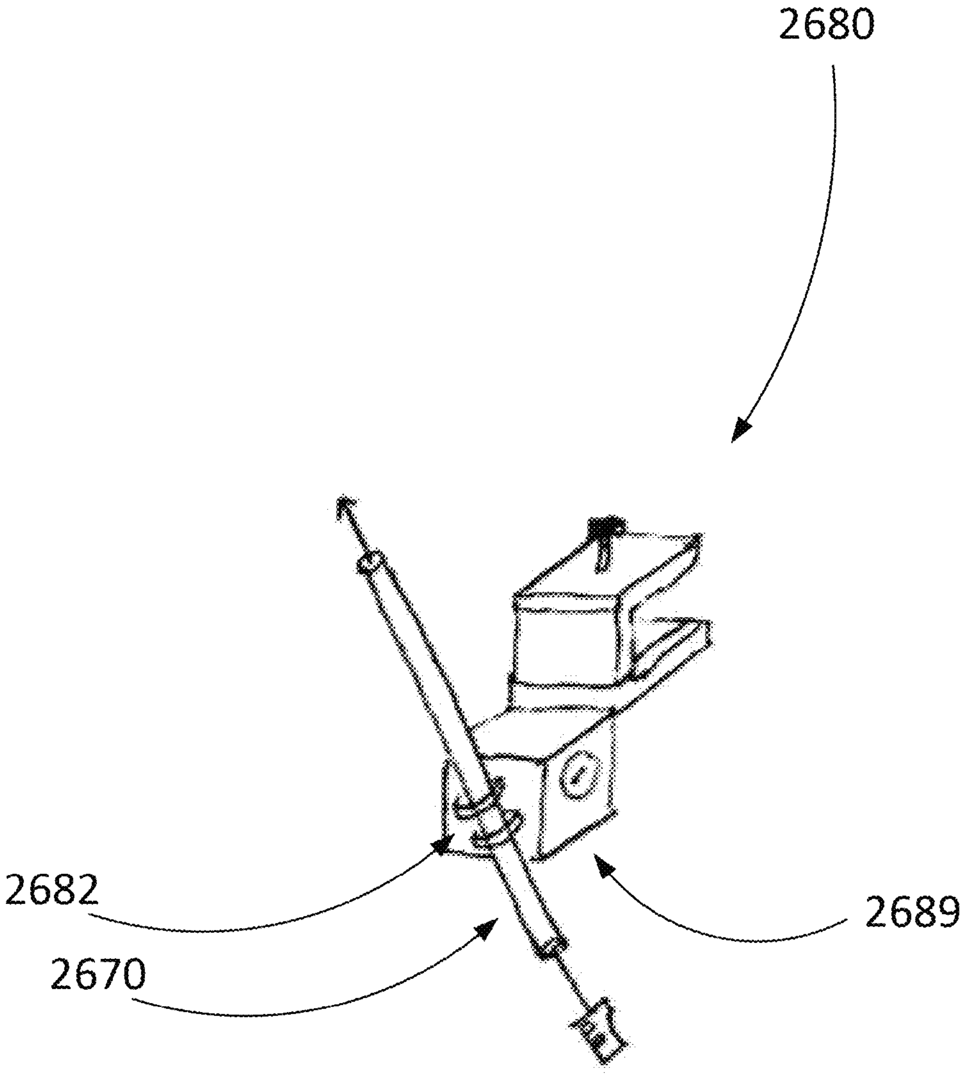
FIG. 33 is a schematic illustration of a cable mount, according to an embodiment.

Although FIG. 9 shows the housing 489 of the cable mount 480 as being shaped such that the portion of the housing 489 supporting the tubular portion or strap 482 is aligned with the portion of the housing 489 configured to receive and couple to a portion of a drum rim, in some embodiments the housing 489 can be formed such that the portion configured to support the tubular portion or strap 482 is vertically lower than the portion configured to receive and couple to a drum rim. For example, FIG. 33 is a schematic illustration of a mounting assembly 2680. The mounting assembly 2680 can be the same or similar in structure and/or function to any of the mounting assemblies described herein, such as the mounting assembly 480. As shown in FIG. 33, the mounting assembly 480 includes a housing 2689 and a tubular portion 2682. The housing 2689 has a first portion configured to be coupled to a drum rim and a second portion vertically lower than the first portion and configured to support the tubular portion 2682.

Figure 24:
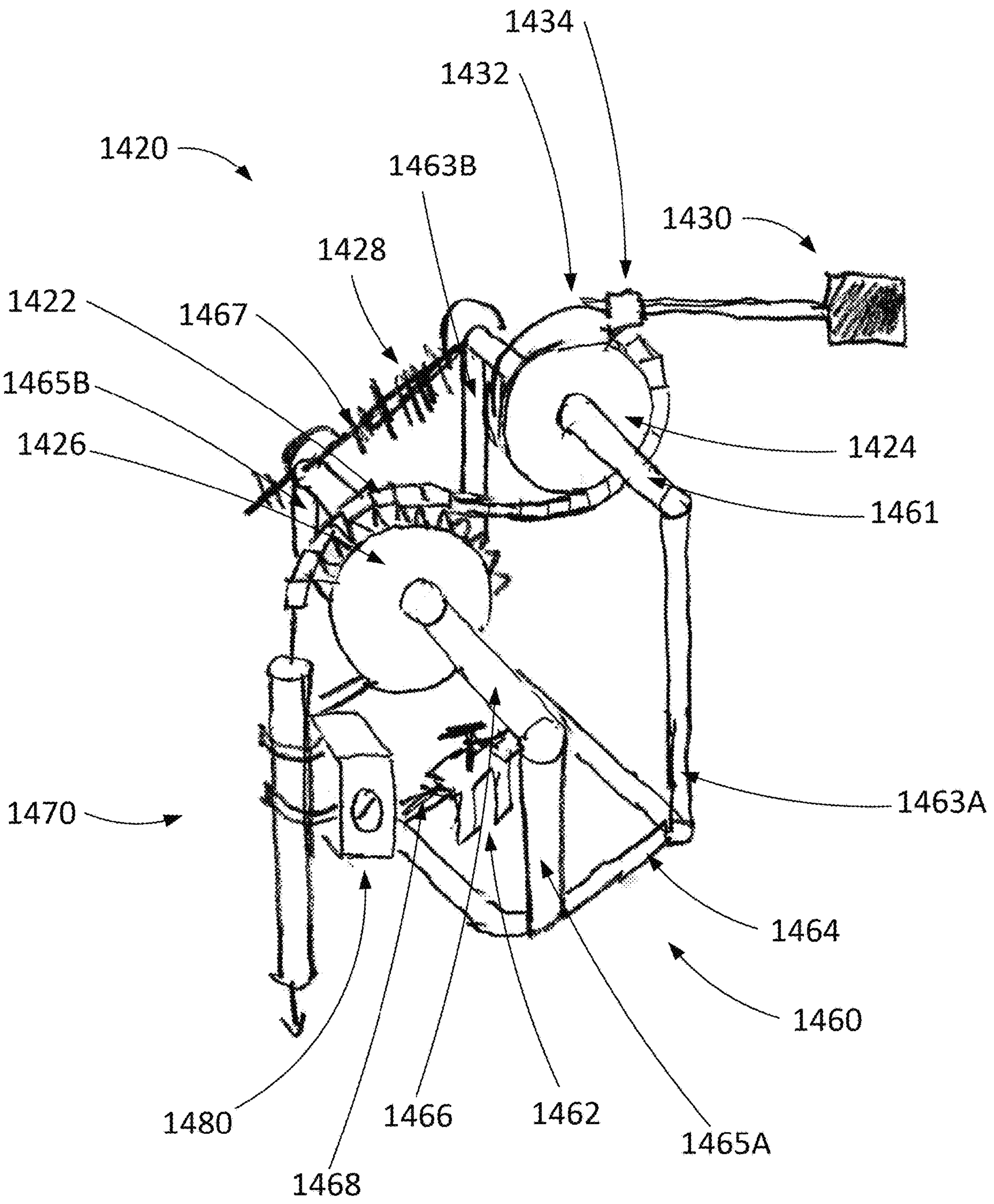
FIG. 24 is a schematic illustration of a striker actuator assembly, according to an embodiment.
Figure 34:
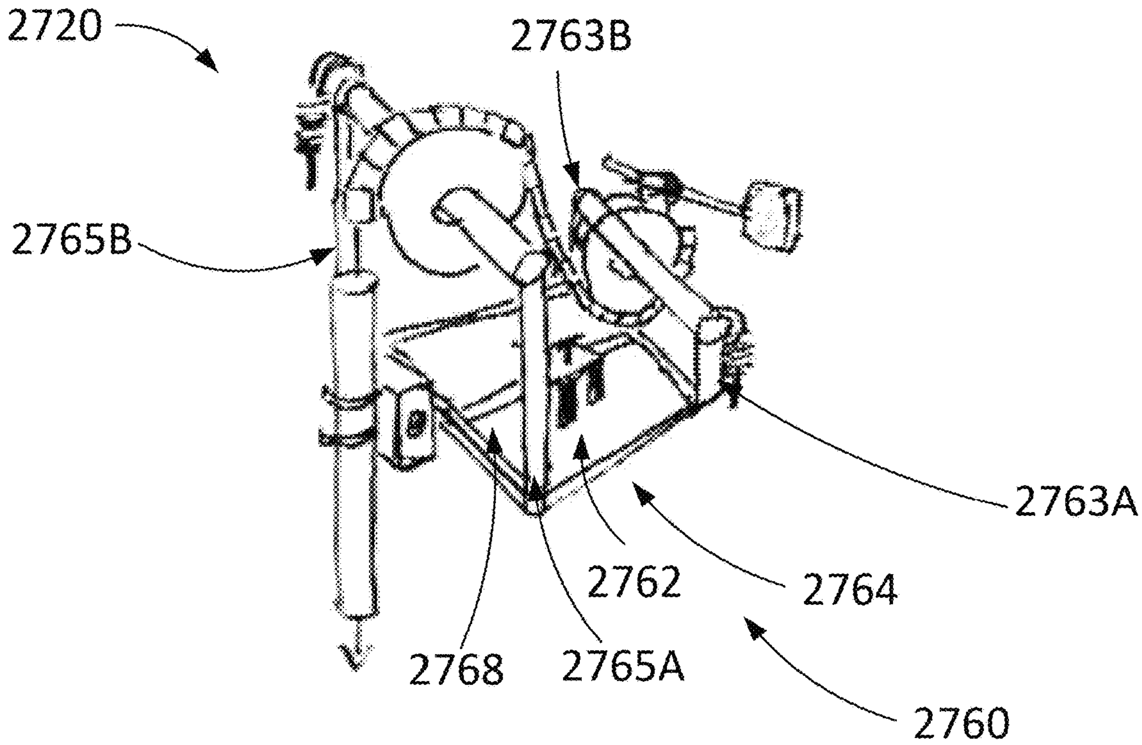
FIG. 34 is a schematic illustration of a striker actuator assembly, according to an embodiment.
Figure 35:
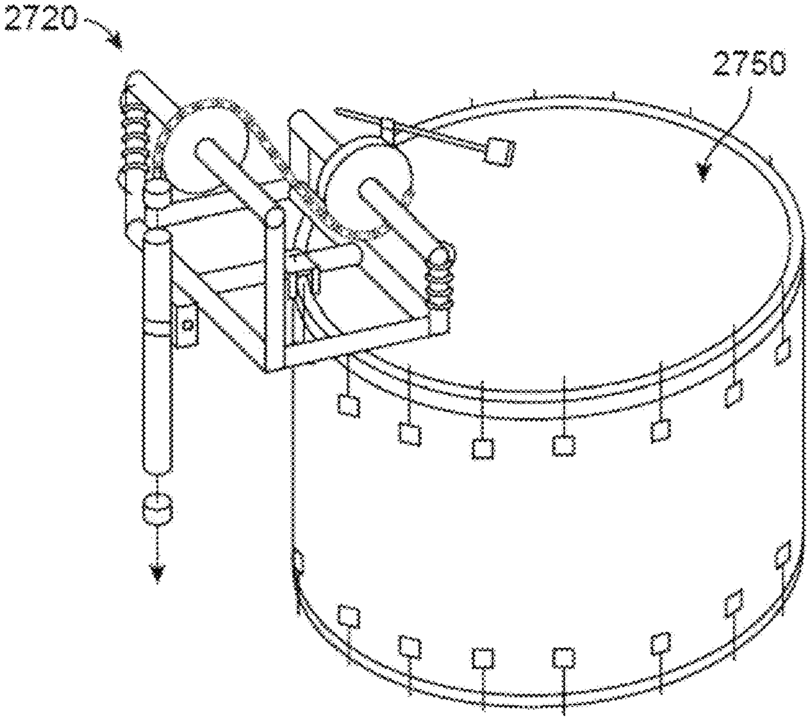
FIG. 35 is a schematic illustration of the striker actuator assembly of FIG. 34 coupled to a drum.

Although FIGS. 4 and 5 show the first post member 463A, the second post member 463B, the third post member 465A, and the fourth post member 465B as having substantially the same height, in some embodiments, a first post member and a second post member can be taller or shorter than the third post member and the fourth post member such that the first rotatable crossbar 461 is disposed higher or lower, respectively, than the second rotatable crossbar 466. For example, FIG. 24 is a schematic perspective view of a striker actuator assembly 1420. The striker actuator assembly 1420 can be the same or similar in structure and/or function to any of the striker actuator assemblies described herein. For example, the striker actuator assembly 1420 includes a mount 1460. The mount 1460 includes a base frame 1464 and a crossbar 1468 extending between two segments of the base frame 1464. The mount 1460 can be coupled to a drum rim or hoop of via a clamp 1462 coupled to the crossbar 1468. The striker actuator assembly 1420 also includes four post members coupled to the base frame 1464, including a first post member 1463A, a second post member 1463B, a third post member 1465A, and a fourth post member 1465B. The first post member 1463A, the second post member 1463B, the third post member 1465A, and the fourth post member 1465B can be the same or similar in structure and/or function to the first post member 463A, the second post member 463B, the third post member 465A, and the fourth post member 465B, respectively, except that the first post member 1463A and the second post member 1463B are longer than the third post member 1465A and the fourth post member 1465B. As another example, FIGS. 34 and 35 are a schematic perspective view of a striker actuator assembly 2720 and a schematic perspective view of the striker actuator assembly 2720 coupled to a drum 2750, respectively. The striker actuator assembly 2720 can be the same or similar in structure and/or function to any of the striker actuator assemblies described herein. For example, the striker actuator assembly 2720 includes a mount 2760. The mount 2760 includes a base frame 2764 and a crossbar 2768 extending between two segments of the base frame 2764. The mount 2760 can be coupled to a drum rim or hoop of via a clamp 2762 coupled to the crossbar 2768. The striker actuator assembly 2720 also includes four post members coupled to the base frame 2764, including a first post member 2763A, a second post member 2763B, a third post member 2765A, and a fourth post member 2765B. The first post member 2763A and the second post member 2763B can be shorter than the third post member 2765A and the fourth post member 2765B.

The striker actuator assembly 1420 also includes a first rotatable crossbar 1461, a second rotatable crossbar 1466, a spring 1428, and a rigid extension member 1467 that can be the same or similar in structure and/or function to the first rotatable crossbar 461, the second rotatable crossbar 466, the spring 428, and the rigid extension member 467, respectively. The striker actuator assembly 1420 also includes a first cam 1424, a second cam 1426, a striker 1430, and a chain 1422 that can be the same or similar in structure and/or function to the first cam 424, the second cam 426, the striker 430, and the chain 422, respectively. The chain 422 can be coupled to a cable subassembly 1470 that is the same or similar in structure and/or function to the cable assembly 470. The cable subassembly 1470 can be coupled to a portion of a drum and/or to the base frame 1464 of the mount 1460 via a cable mount 1480 that is the same or similar in structure and/or function to the cable mount 480.

As shown in FIG. 24, the striker actuator assembly 1420 can also include a striker cam 1432 and an adapter 1434. The striker cam 1432 and the adapter 1434 can be the same or similar in structure and/or function to the cam 2032 and the adapter 2034 shown and described with respect to FIGS. 21A-21F below. Thus, rotation of the first cam 1424 by the chain 1461 can cause the first rotatable crossbar 1461 to rotated due to being rotationally fixed relative to the first cam 1424. The striker cam 1432 can rotate under the control of the first rotatable crossbar 1461, the first cam 1424, and the chain 1461 due to being rotationally fixed relative to the first rotatable crossbar 1461, causing the striker 1430 coupled to the striker cam 1432 via the adapter 1434 to rotate (e.g., between a non-contact position and a contact position relative to a drumhead).

Figure 25:
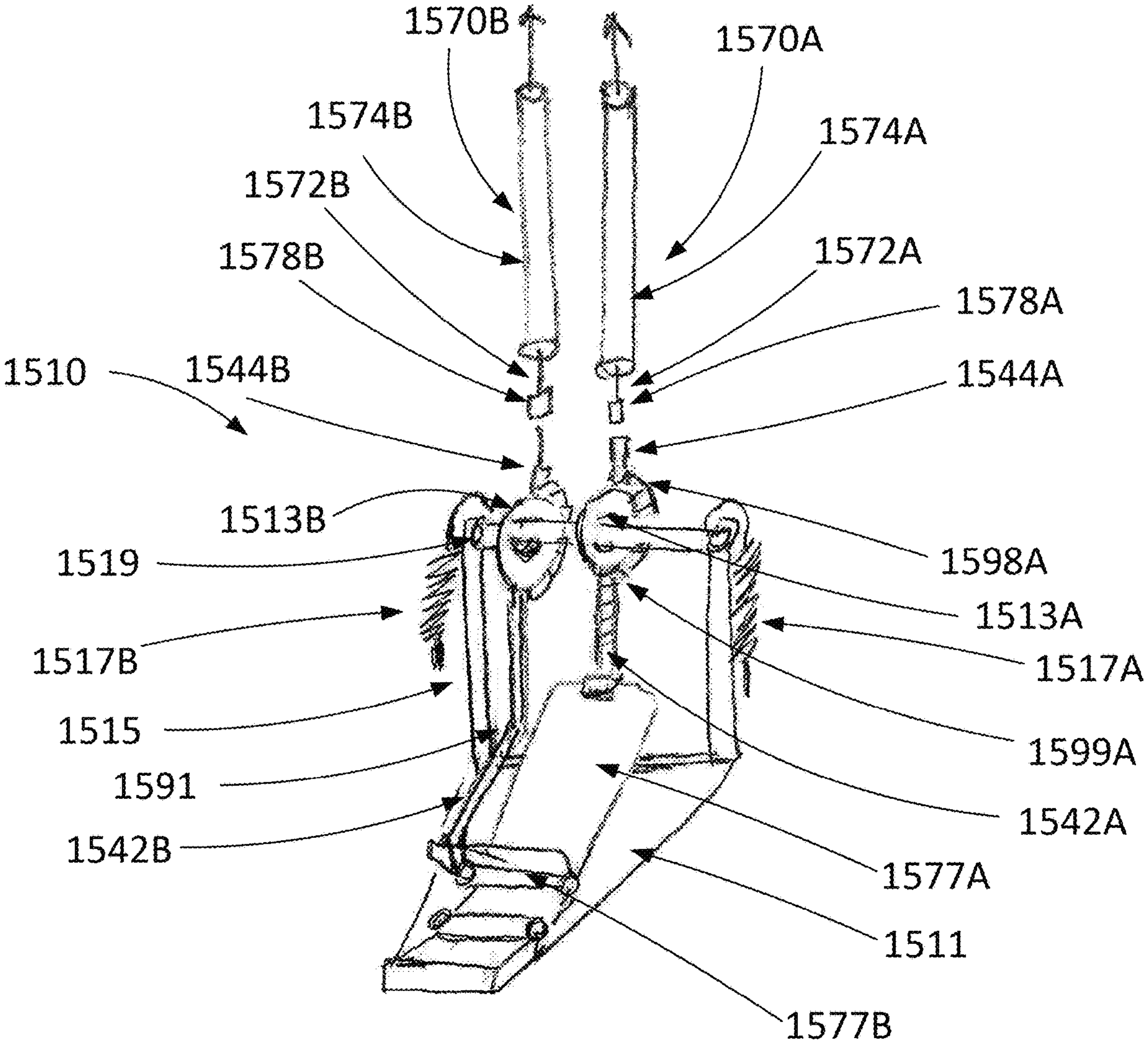
FIG. 25 is a schematic illustration of a remote actuator assembly, according to an embodiment.

In some embodiments, a remote actuator can be configured to actuate more than one striker actuator assembly. For example, FIG. 25 is a schematic illustration of a remote actuator 1510. The remote actuator 1510 can be the same or similar in structure and/or function to any of the remote actuators described herein. For example, the remote actuator 1510 can include a pedal 1511, a cam support 1515, a spring 1517A, and a rotatable crossbar 1519 that can be the same or similar in structure and/or function to any of the pedals, cam supports, and rotatable crossbars described herein, such as the pedal 411, the cam support 415, a spring 417, and the rotatable crossbar 419. Additionally, the remote actuator 1510 includes a first chain 1542A, a first cam 1513A coupled to the rotatable crossbar 1519, and a first energy transfer mechanism 1544A that can be the same or similar in structure and/or function, for example, to the first chain 442, the first cam 413, and the energy transfer mechanism 444. For example, the first chain 1542A can have a first portion 1599A that is fixed to the first cam 1513A at a first location along the outer surface of the first cam 1513A and a second portion 1598A that is fixed to the first cam 1513A at a second location along the outer surface of the first cam 1513A. The first energy transfer mechanism 1544A can be configured to be coupled to a coupling member 1578A of a first cable subassembly 1570A such that actuation of a toe portion 1577A of the pedal 1511 (e.g., a downward force against the toe portion 1577A) translates a cable 1572A downward through a sheath 1574A (e.g., a flexible sheath). Thus, when the first cable subassembly 1570A is operatively coupled to a striker actuator assembly (not shown), such as any of the striker actuator assemblies described herein, actuation of the toe portion 1577A of the pedal 1511 can actuate the striker actuator assembly.

As shown in FIG. 25, a second cam 1513B is coupled to the rotatable crossbar 1519 and spaced from the first cam 1513A. The second cam 1513B is configured to be rotatable about the rotatable crossbar 1519. The remote actuator 1510 includes a second spring 1517B and a post assembly 1542B. As shown in FIG. 25, a coupling component 1591 can be coupled to or included in the cam support 1515 such that the post assembly 1542B (e.g., a first post member of the post assembly 1542B) can extend from the heel portion 1577B to the coupling component 1591, and the post assembly 1542B (e.g., a second post member of the post assembly 1542B) can extend from the coupling component 1591 toward the second cam 1513B (e.g., in an upward direction). The post assembly 1542B can be coupled to the second cam 1513B in the same or similar manner as the first chain 1542A is coupled to the first cam 1513A. The second cam 1513B has a first end coupled to a second energy transfer mechanism 1544B and a second end coupled to a heel portion 1577B of the pedal 1511. Actuation of the heel portion 1577B pulls the post assembly 1542B such that the portion of the post assembly 1542B coupled to the outer surface of the second cam 1513B is pulled downward and about the second cam 1513B rotates about the rotatable crossbar 1519 such that the second energy transfer mechanism 1544B is pulled downward. The second spring 1517B has a first end coupled to the cam support 1515 and a second end associated with the second cam 1513B (e.g., coupled to the second cam 1513B or to a component coupled to the second cam 1513B). When the heel portion 1577B of the pedal is actuated to pull on the post assembly 1542B causing rotation of the second cam 1513B, the second spring 1517B can be transitioned from a neutral configuration to an energized configuration (e.g., a stretched or compressed configuration). When the heel portion 1577B of the pedal 1511 is allowed to return to a non-actuated configuration (e.g., released by raising the user's foot relative to the heel portion 1577B), the spring can transition back to the first configuration, causing the cam 1513B to rotate back to an initial configuration in which the second energy transfer mechanism 1544B is higher than in the actuated configuration. As shown in FIG. 25, the second energy transfer mechanism 1544B can be configured to be coupled to a coupling member 1578B of a second cable subassembly 1570B such that actuation of the heel portion 1577B of the pedal 1511 (e.g., a downward force against the heel portion 1577B) translates a cable 1572B downward through a sheath 1574B. Thus, when the second cable subassembly 1570B is operatively coupled to a striker actuator assembly (not shown) (e.g., different from the striker actuator assembly operatively coupled to the first cable subassembly 1570A and the toe portion 1577A of the pedal 1511), such as any of the striker actuator assemblies described herein, actuation of the heel portion 1577B of the pedal 1511 can actuate the striker actuator assembly. Although the first chain 1542A is described as a chain, in some embodiments the first chain 1542A can be formed of any suitable material or combination of materials, such as chains, cable, or ropes.

Figure 26:
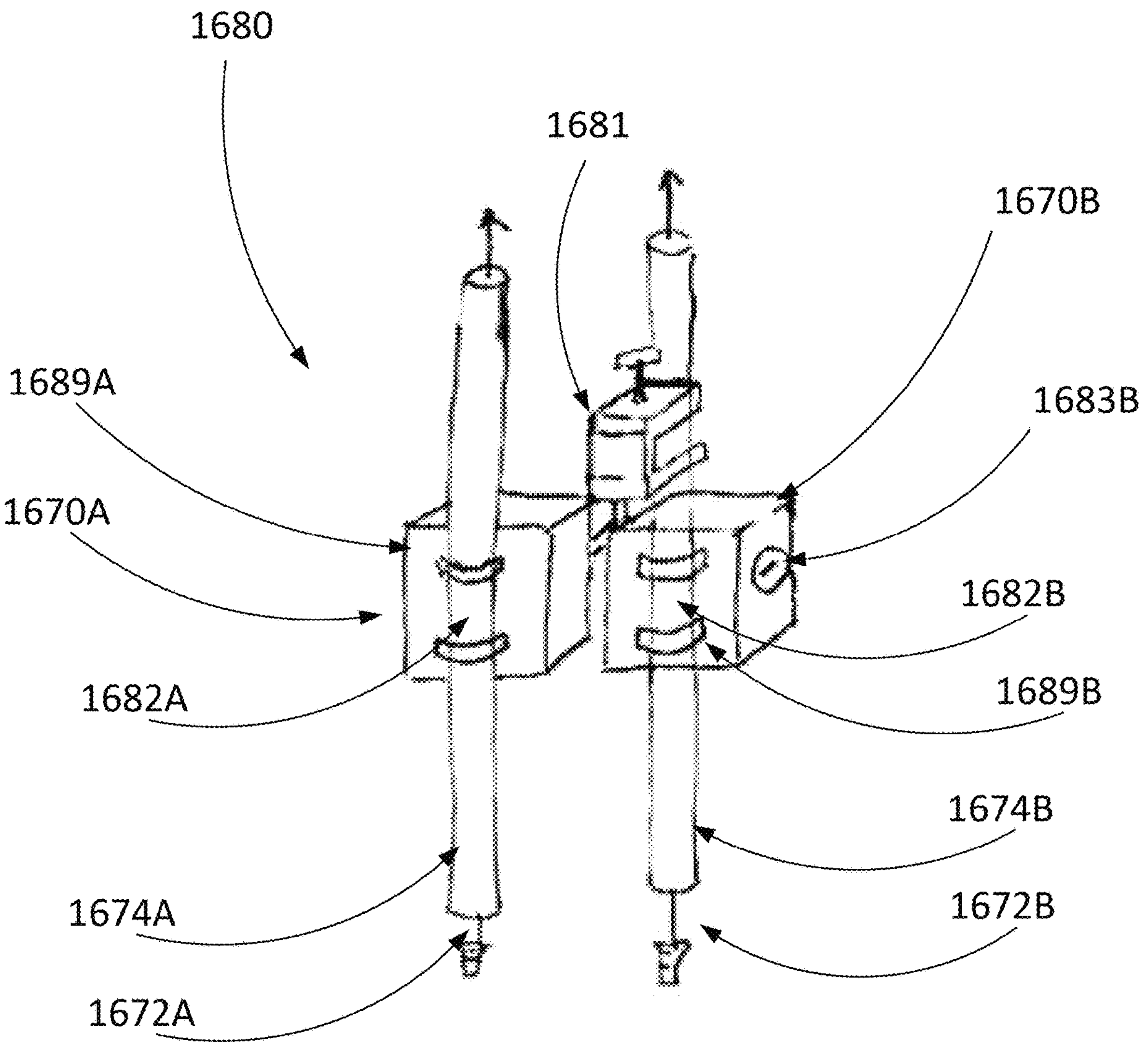
FIG. 26 is a schematic illustration of a cable mount, according to an embodiment.

FIG. 26 is a schematic illustration of a cable mount 1680 configured to mount a portion of a first cable subassembly 1670A and a portion of a second cable subassembly 1670B to a drum (not shown) (e.g., to a hoop or rim of a drum) (e.g., such that the first cable subassembly 1670A and the second cable subassembly 1670B (e.g., a cable within each) are each aligned with the direction of the pedal of a remote actuator, such as any of the remote actuators described herein, is configured to pull the end of the first cable subassembly 1670A or the second cable subassembly 1670B). The cable mount 1680 can be similar in structure and/or function to any of the cable mounts described herein, such as the cable mount 480. For example, the cable mount 1680 includes a mounting assembly 1681 that can be the same or similar in structure and/or function to the mounting assembly 481 described above with respect to FIG. 9. The cable mount also includes a first tubular portion 1682A coupled to a first housing 1689A via a first rotatable component extending into an interior of the first housing 1689A and a second tubular portion 1682B coupled to a second housing 1689B via a second rotatable component extending into an interior of the second housing 1689B. The first tubular portion 1682A and the second tubular portion 1682B can be the same or similar in structure and/or function to the tubular portion 482 described above. For example, the first tubular portion 1682A has a pinch point on each end configured to engage a first sheath 1674A (e.g., a flexible sheath) of the first cable subassembly 1670A such that the first sheath 1674A is immovable relative to the tubular portion 1682A but a first cable 1672A of the first cable subassembly 1670A is translatable through the first sheath 1674A. The second tubular portion 1682B has a pinch point on each end configured to engage a second sheath 1674B (e.g., a flexible sheath) of the second cable subassembly 1670B such that the second sheath 1674B is immovable relative to the tubular portion 1682B but a second cable 1672B of the second cable subassembly 1670B is translatable through the second sheath 1674B. A first thumb tightening knob (not shown) can be included and configured to engage with the rotatable component with in the first housing 1689A and a second thumb tightening knob 1683B can be included and configured to engage with the rotatable component within the second housing 1689B similarly as described above with respect to the thumb tightening knob 483. As shown in FIG. 26, the first housing 1689A and the second housing 1689B can optionally be coupled together via a connecting portion of a bracket. In some embodiments, the first housing 1689A can be directly coupled to the mounting assembly 1681 and the second housing 1689A can be coupled to the mounting assembly 1681 via the first housing 1689A, or vice versa. In some embodiments, both the first housing 1689A and the second housing 1689B can be directly coupled to the mounting assembly 1681.

Figure 27:
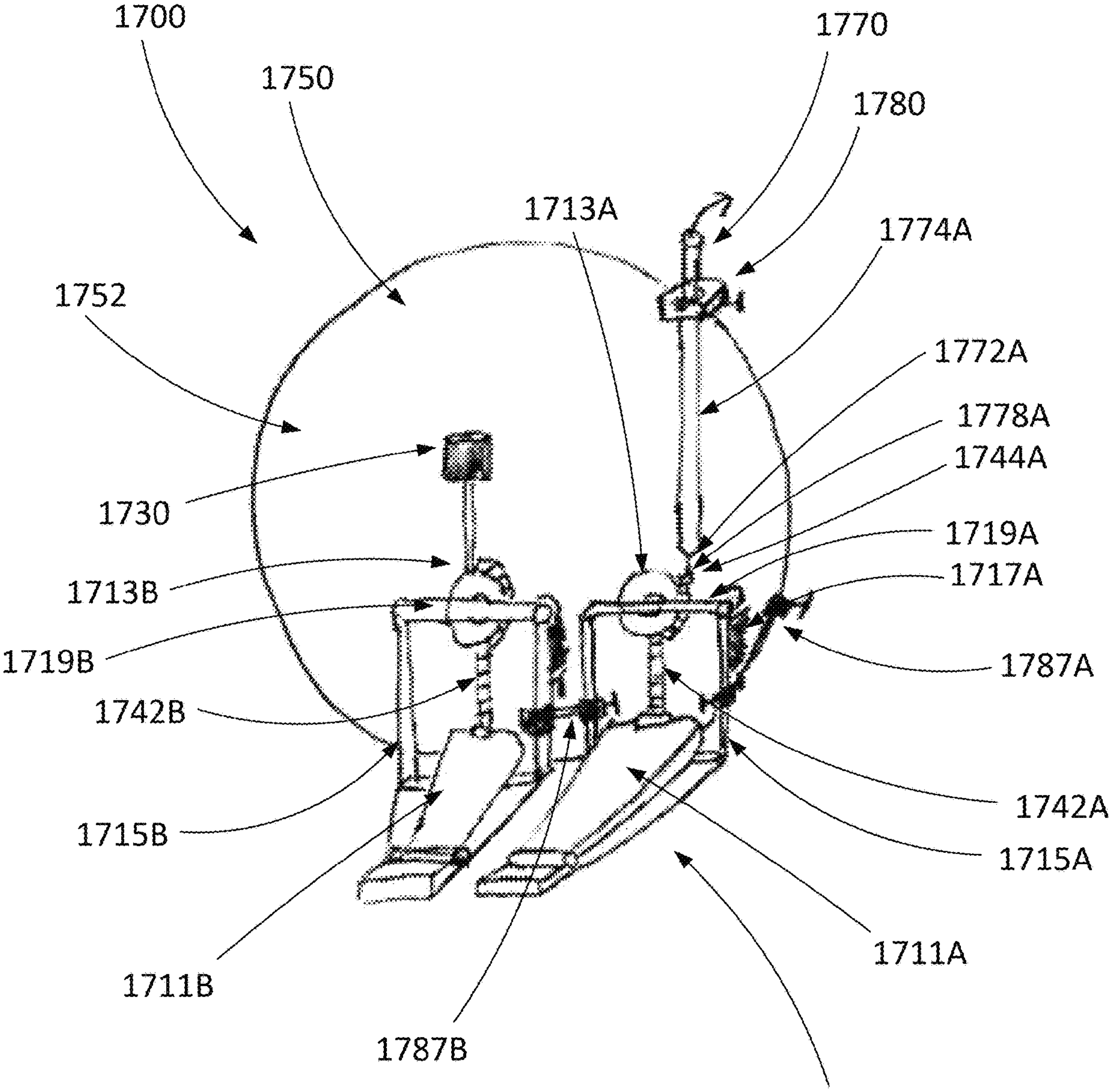
FIG. 27 is a schematic illustration of a system including a remote actuator assembly, a cable mount, and a cable subassembly disposed relative to a drum, according to an embodiment.

In some embodiments, a remote actuator can include or be coupled to a non-remote actuator. For example, FIG. 27 is a schematic illustration of a system 1700. The system 1700 includes a remote actuator 1710, a cable subassembly 1770, and a cable mount 1780. The remote actuator 1710, the cable subassembly 1770, and the cable mount 1780 can be the same or similar in structure and/or function to any of the remote actuators, cable subassemblies, and cable mounts described herein, respectively. For example, the remote actuator 1710 includes a pedal 1711A, a cam support 1715A, a spring 1717A, and a rotatable crossbar 1719A that can be the same or similar in structure and/or function to any of the pedals, cam supports, and rotatable crossbars described herein, such as the pedal 411, the cam support 415, the spring 417, and the rotatable crossbar 419, respectively. Additionally, the remote actuator 1710 includes a first chain 1742A, a first cam 1713A coupled to the rotatable crossbar 1719A, and a first energy transfer mechanism 1744A that can be the same or similar in structure and/or function, for example, to the first chain 442, the first cam 413, and the energy transfer mechanism 444, respectively. The first energy transfer mechanism 1744A can be configured to be coupled to a coupling member 1778A of the cable subassembly 1770 such that actuation of the pedal 1711 (e.g., a downward force against the pedal 1711) causes translation of a cable 1772A downward through a sheath 1774A (e.g., a flexible sheath) of the cable subassembly 1770. Thus, when the cable subassembly 1770 is operatively coupled to a striker actuator assembly (not shown), such as any of the striker actuator assemblies described herein, depression of the pedal 1711A can actuate the striker actuator assembly.

As shown in FIG. 27, a portion of the cable subassembly 1770 can be coupled to a rim of a drum 1750 via the cable mount 1780. Thus, the cable mount 1780 can support a portion of the cable subassembly 1770 at a location along a path of the cable subassembly 1770 between the remote actuator 1710 and a striker actuator assembly (not shown) (e.g., any of the striker actuator assemblies described herein) associated with (e.g., coupled to) a second drum (not shown) and configured to move at least one striker between a non-contact and a contact position relative to a surface of a drumhead of the second drum. Additionally, the cam support 1715A can be coupled to the rim of the drum 1750 via a bracket assembly 1787A. The bracket assembly 1787A can include a thumb tightener on each end such that the bracket assembly 1787A can be mounted to the cam support 1715A and the rim of the drum 1750 via tightening the thumb tighteners to engage the cam support 1715A and the rim of the drum 1750 against other portions of the bracket assembly 1787A.

The system 1700 also includes a second pedal 1711B, a second cam support 1715B, a second cam 1713B, a second rotatable crossbar 1719B, and a second chain 1742B. The second pedal 1711B, the second cam support 1715B, the second cam 1713B, and the second chain 1742B can be the same or similar in structure and/or function to any of the pedals, cam supports, cams, rotatable crossbars, or chains described herein with respect to other remote actuators. Although not shown, a spring can be coupled to the second rotatable crossbar 1719B and to the second cam support 1715B and can be used to urge the second cam 1713B toward a neutral first configuration in the same or similar manner as described with respect to other springs herein, such as the spring 1717A. As shown in FIG. 27, a striker 1730 can be coupled to the second cam 1713B such that actuation of the second pedal 1711B causes rotation of the second cam 1713B and displacement of the striker 1730 between a non-contact position relative to a drumhead 1752 of the drum 1750 and a contact position with the drumhead 1752. The cam support 1715B can be coupled to the cam support 1715A via a connecting bracket 1787B. The connecting bracket 1787B can stabilize the cam support 1715B relative to the cam support 1715A and the drumhead 1752. The connecting bracket 1787B can include a thumb tightener on each end such that the connecting bracket 1787B can be mounted to the cam support 1715B and the cam support 1715A via tightening the thumb tighteners to engage the cam support 1715B and the cam support 1715A between the thumb tighteners and other portions of the connecting bracket 1787B. Thus, a user can alternate pressing his foot against the first pedal 1711A and the second pedal 1711B in various sequences to produce a sequence of percussive sounds by causing the striker 1730 to contact the drumhead 1752 and actuating a striker actuator assembly to contact another remote drumhead (e.g., a non-vertical drumhead).

Figure 31:
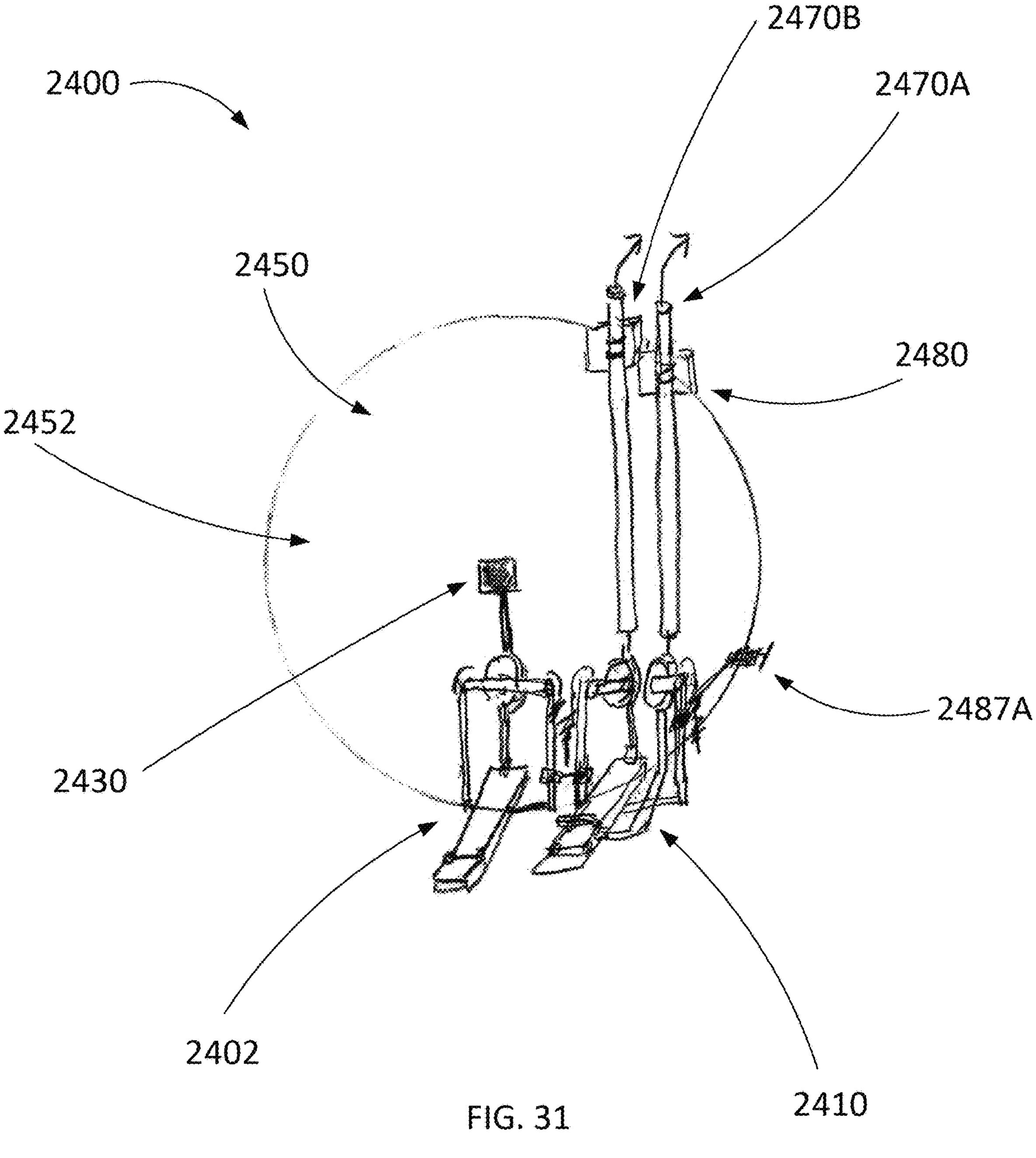
FIG. 31 is a schematic illustration of a system including a remote actuator assembly, a cable mount, and a cable subassembly disposed relative to a drum, according to an embodiment.

FIG. 31 is a schematic illustration of a system 2400. The system 2400 can be the same or similar in structure and/or function to any of the systems described herein. For example, the system 2400 includes a remote actuator 2410, a first cable subassembly 2470A, a second cable subassembly 2470B, and a cable mount 2480 (which can optionally include a discrete and/or coupled cable mounts for each respective cable subassembly). The cable mount 2480 can be mounted to a rim of the drum 2450 and can support a portion of the cable subassembly 2470A and a portion of the cable subassembly 2470B at a location along a path of the cable subassembly 2470A and the cable subassembly 2470B between the remote actuator 2410 and a striker actuator assembly (not shown) (e.g., any of the striker actuator assemblies described herein) associated with (e.g., coupled to) a second drum (not shown) and configured to move at least one striker between a non-contact and a contact position relative to a surface of a drumhead of the second drum. The remote actuator 2410 can be the same or similar in structure and/or function to, for example, the remote actuator 1510 shown and described with respect to FIG. 25. As shown in FIG. 31, in some embodiments, rather than including a single rotatable crossbar 1519, the two cams of the remote actuator 1510 associated with the respective first cable subassembly 2470A and the second cable subassembly 2470B can be disposed on distinct rotatable bars extending from opposing sides of a cam support. Additionally, as shown in FIG. 31, the remote actuator 1510 can be coupled to the rim of the drum 2450 via a bracket assembly 2487A that can be the same or similar in structure and/or function to the bracket assembly 1787A described above.

Figure 10:
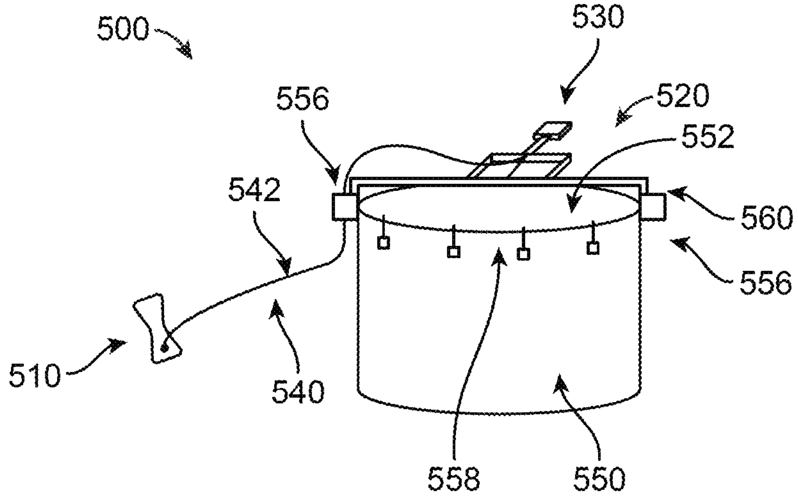
FIG. 10 is a schematic illustration of a system, according to an embodiment.

FIG. 10 is a schematic illustration of a system 500. The system 500 can be the same or similar in structure and/or function to any of the systems described herein. The system 500 has a striker actuator assembly 520 including a mount 560 that is mounted to span from a first edge to a second edge of a rim 558 of the drum 550. The system 500 includes a remote actuator 510 that is operatively coupled to the striker actuator assembly 520 by a remote coupling 540 including a cable 542. The striker actuator assembly 520 can be centered across the drumhead 552 such that a striker 530 can extend from a center of the drumhead 552 toward an edge of the drumhead 552 in a contact position with the drumhead 552. The mount 560 can be coupled to opposing lugs 556 or opposing rim or hoop portions of the drum 550 across the drumhead 552. In some embodiments, the striker actuator assembly 520 can be mechanically actuated (e.g., via one or more cams as described with respect to various embodiments herein). In some embodiments, the striker actuator assembly 520 can be electromechanically actuated (e.g., via one or more solenoids configured to communicate with a remote actuator via wired or wireless communication).

Figure 30:
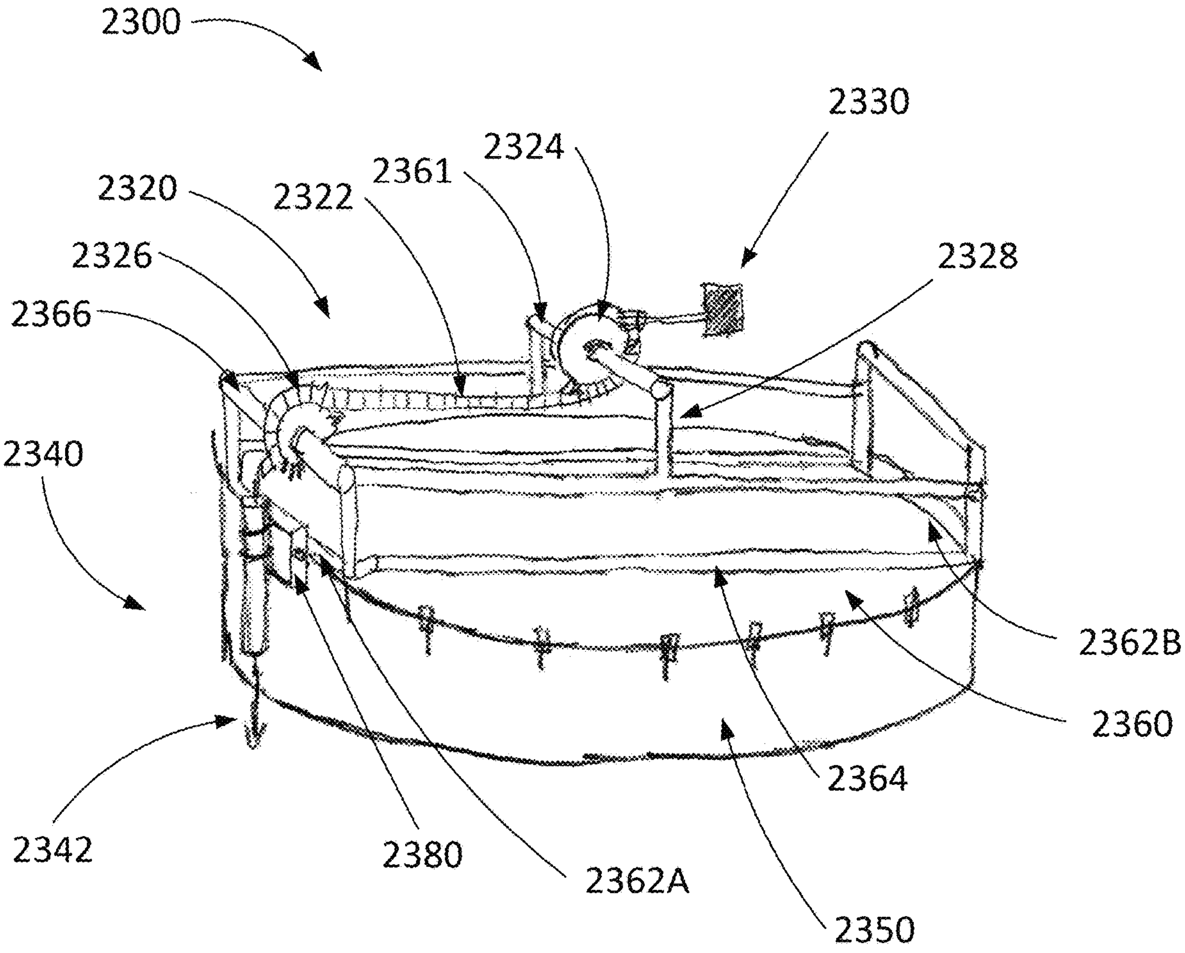
FIG. 30 is a schematic illustration of a system including a striker actuator assembly, a cable subassembly, and a cable mount, according to an embodiment.

FIG. 30 is a schematic illustration of a system 2300. The system 2300 can be the same or similar in structure and/or function to any of the systems described herein, such as the system 500. The system 2300 has a striker actuator assembly 2320 including a mount 2360 that is mounted to span from a first edge to a second edge of a rim or hoop, or to span between opposing lugs of a drum 2350. The system 2300 includes a remote coupling 2340 (e.g., a cable subassembly as described with respect to other embodiments herein) including a cable 2342 that is configured to be operatively coupled to a remote actuator (not shown) (e.g., any of the remote actuators described herein) such that the remote actuator can control a position of a striker 2330 via the remote coupling 2340 and the striker actuator assembly 2320.

The striker actuator assembly 2320 can be the same or similar in structure and/or function to any of the striker actuator assemblies described herein, such as the striker actuator assembly 420 and/or the striker actuator assembly 1420. For example, the striker actuator assembly 2320 includes a first cam 2324, a chain 2322, a second cam 2326, an optional spring (not shown but potential location indicated by 2328), a first rotatable crossbar 2361, and a second rotatable crossbar 2366, which can each be the same or similar in structure and/or function the first cam 423, the chain 422, the second cam 426, the spring 428, the first rotatable crossbar 461, and the second rotatable crossbar 466, respectively. As shown in FIG. 30, the mount 2360 can include a box frame 2364 which includes the second rotatable crossbar 2366 as a segment of the box frame 2364. A first post and a second post extend upward from opposing midpoints of the box frame 2364 to support the first rotatable crossbar 2366. The spring 2328 can have a first end coupled to the first rotatable crossbar 2366 and a second end coupled to the box frame 2364 of the mount 2360. The mount 2360 can also include an optional first clamp (not shown but optional location indicated by 2362A) and an optional second clamp (not shown but optional location indicated by 2362B) coupled to the box frame 2364 and extending downward such that the box frame 2364 can be mounted to opposing lugs or rim or hoop portions of a drum via the first clamp 2362A and the second clamp.

Figure 32:
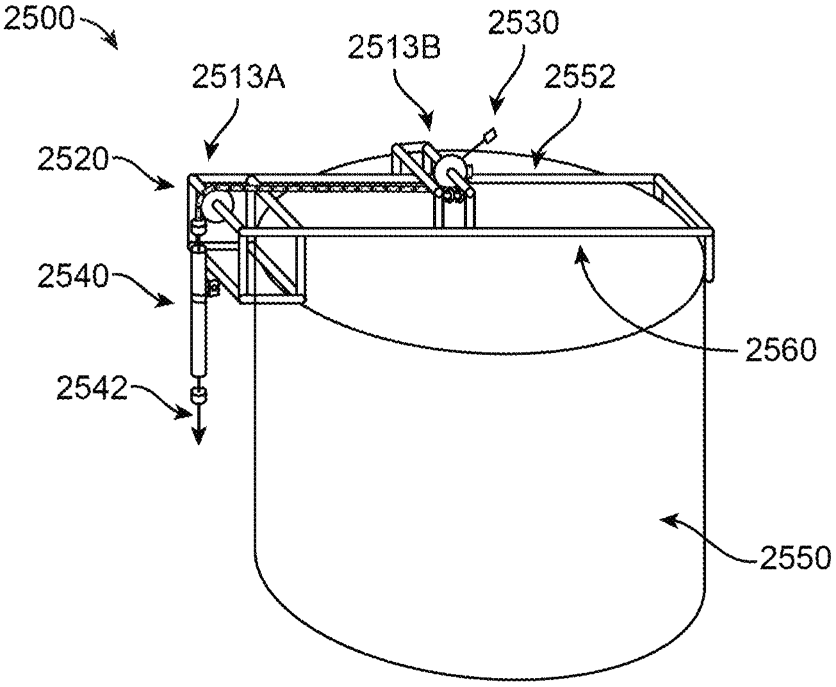
FIG. 32 is a schematic illustration of a system including a striker actuator assembly, a cable subassembly, and a cable mount, according to an embodiment.

FIG. 32 is a schematic illustration of a system 2500. The system 2500 can be the same or similar in structure and/or function to any of the systems described herein, such as the system 500. The system 2500 has a striker actuator assembly 2520 including a mount 2560 that is mounted to span from a first edge to a second edge of a hoop or rim of a drum 2550 (or to span between opposing lugs of the drum 2550). The system 2500 includes a remote coupling 2540 (e.g., a cable subassembly as described with respect to other embodiments herein) including a cable 2542 that is configured to be operatively coupled to a remote actuator (not shown) (e.g., any of the remote actuators described herein) such that the remote actuator can control a position of a striker 2530 relative to a drumhead 2552 of the drum 2550 via the remote coupling 2540 and the striker actuator assembly 2520.

The striker actuator assembly 2520 can be the same or similar in structure and/or function to any of the striker actuator assemblies described herein, such as the striker actuator assembly 420 and/or the striker actuator assembly 1420. As shown in FIG. 32, the mount 2560 can include a first structure supporting a first cam 2513A of the striker actuator assembly 2520 at a first height and a second structure supporting a second cam 2513B of the second striker actuator assembly 2520 at a second height relative to the drumhead 2552. The mount 2560 includes two elongated support bars extending from the first structure on a first side of the drumhead 2552 to a second opposite side of the drumhead 2552. The second structure can be supported by the two elongated support bars at a location between the first side and the second side of the drumhead 2552 (e.g., at a midpoint or any other suitable location).

Figure 11:
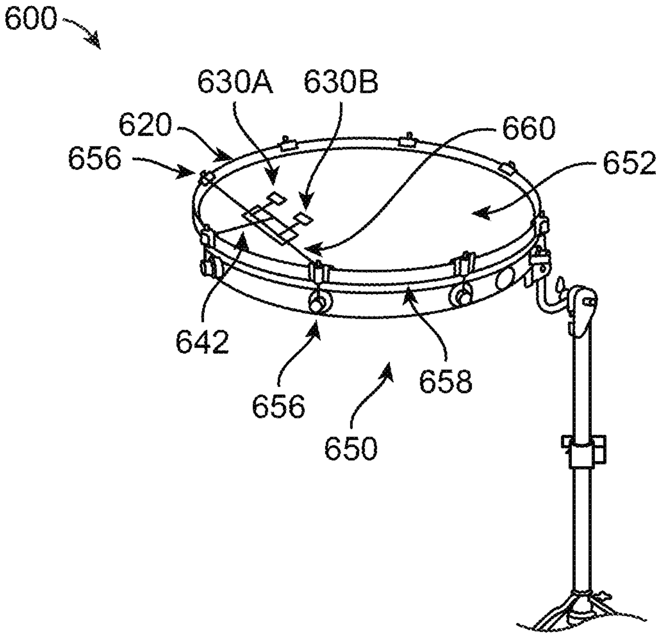
FIG. 11 is a schematic illustration of a perspective view of a system, according to an embodiment.

FIG. 11 is a schematic illustration of a system 600. The system 600 can be the same or similar in structure and/or function to any of the systems described herein. The system 600 has a striker actuator assembly 620 including a mount 660 that is mounted to the span from a first edge to a second edge of a rim 658 of the drum 650. The striker actuator assembly 620 can be off-center relative to the drumhead such that one or more strikers (e.g., a first striker 630A and a second striker 630B) can extend toward a center of the drumhead in a contact position. The mount 660 can be coupled between non-adjacent or opposing lugs 656 or between opposing rim or hoop portions of the drum 650 across the drumhead. In some embodiments, the striker actuator assembly 620 can be mechanically actuated (e.g., via one or more cams as described with respect to various embodiments herein). In some embodiments, the striker actuator assembly 620 can be electromechanically actuated (e.g., via one or more solenoids configured to communicate with a remote actuator via wired or wireless communication).

Figure 12:
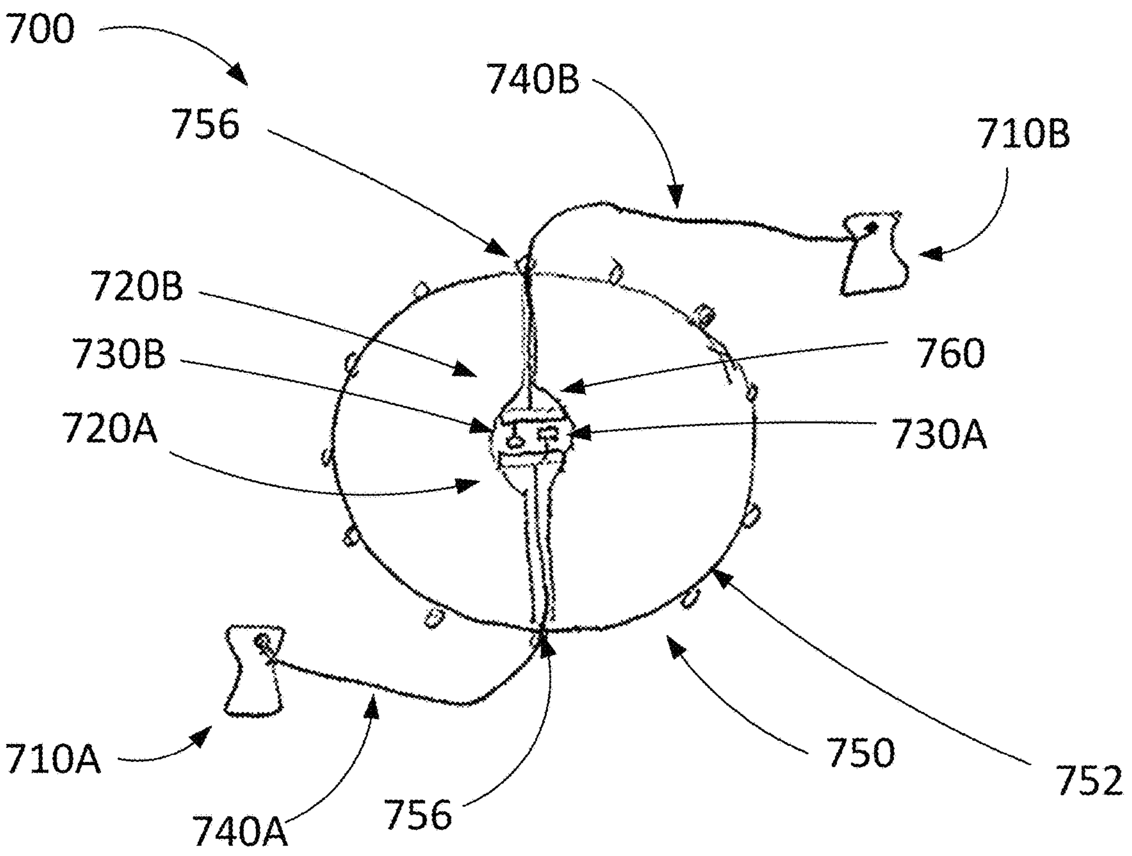
FIG. 12 is a schematic illustration of a top view of a system, according to an embodiment.
Figure 13:
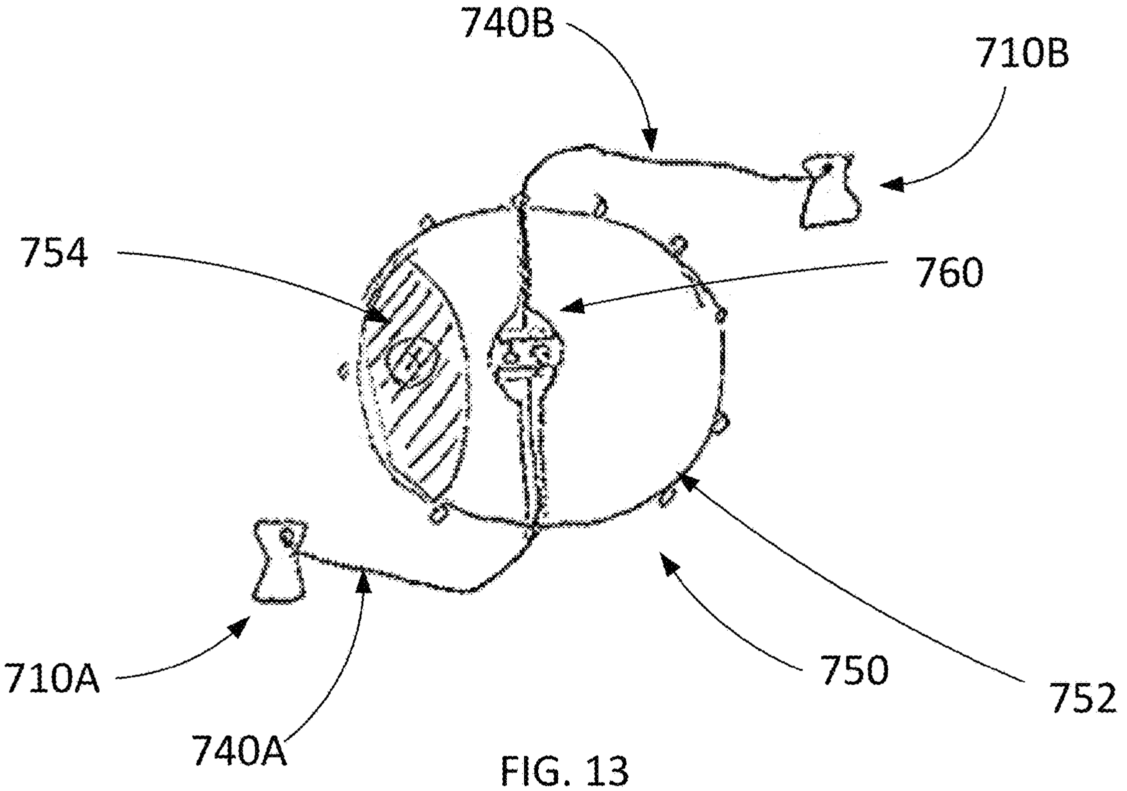
FIG. 13 is a schematic illustration of a top view of the system of FIG. 12 including a plastic overlay portion.

FIG. 12 is a schematic illustration of a system 700 mounted on a drum 750. The system 700 can be the same or similar in structure and/or function to any of the systems described herein. The system 700 includes a first striker actuator assembly 720A and a second striker actuator assembly 720B sharing a common mount 760. The mount 760 is configured to be mounted across a drumhead 752 (e.g., mounted to span from a first edge to a second edge of a hoop or rim of the drum 750 or to span between opposing lugs of the drum 750). The first striker actuator assembly 720A is coupled to a first remote actuator 710A via a first remote coupling 740A. The second striker actuator assembly 720B is coupled to a second remote actuator 720A via a second remote coupling 740B. The first striker actuator assembly 720A is configured to control the position of a first striker 730A and the second striker actuator assembly 720B is configured to control the position of the second striker 730B. FIG. 13 is a schematic illustration of the system 700 mounted on the drum 750 with a plastic overlay portion 754 disposed on a portion of the surface of the drumhead 752. The plastic overlay portion 754 can be used to protect the drumhead 752 such that the longevity of the drumhead 752 can be increased. In some embodiments, the striker actuator assembly 720 can be mechanically actuated (e.g., via one or more cams as described with respect to various embodiments herein). In some embodiments, the striker actuator assembly 720 can be electromechanically actuated (e.g., via one or more solenoids configured to communicate with a remote actuator via wired or wireless communication).

Figure 14:
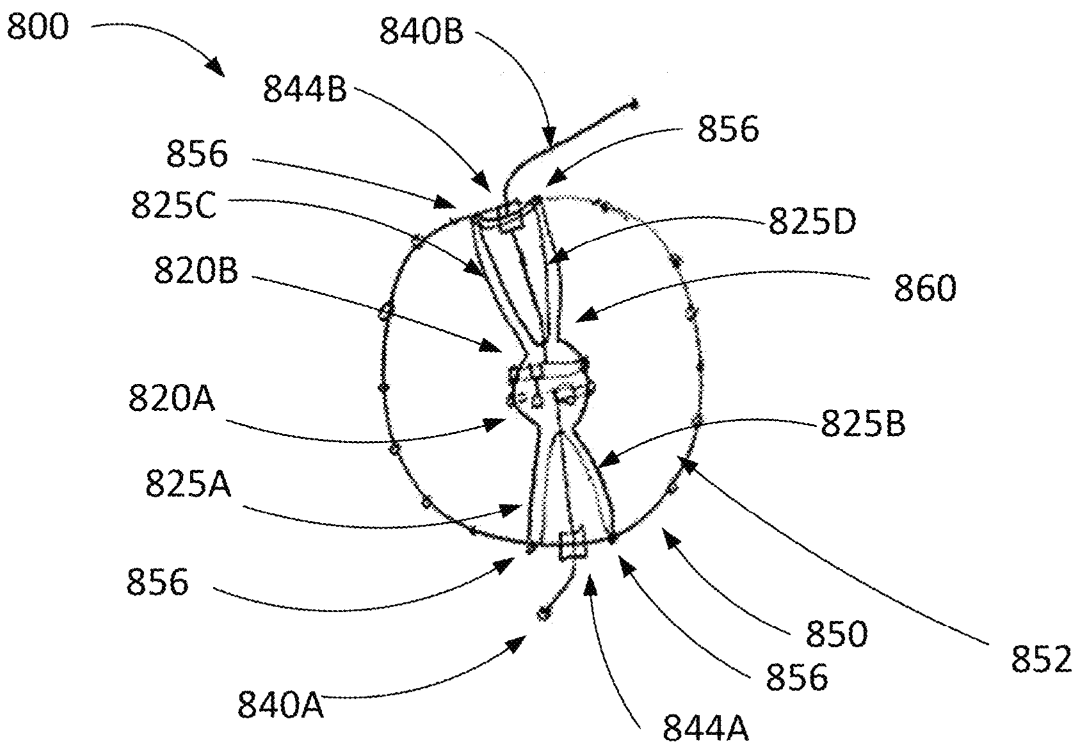
FIG. 14 is a schematic illustration of a top view of a system, according to an embodiment.
Figure 15:
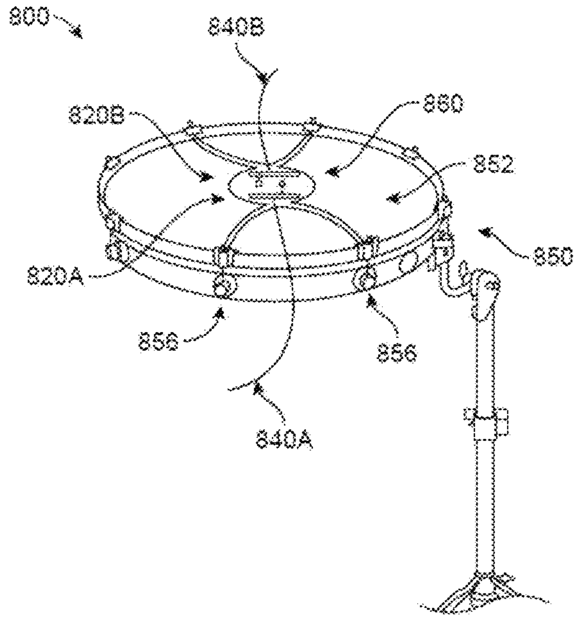
FIG. 15 is a schematic illustration of a perspective view of the system of FIG. 14.

FIGS. 14 and 15 are schematic illustrations of a top view and a perspective view of a portion of a system 800. The system 800 can be the same or similar in structure and/or function to any of the systems described herein. The system 800 includes a first striker actuator assembly 820A and a second striker actuator assembly 820B sharing a common mount 860. The mount 860 is configured to be mounted across a drumhead 852 with a first leg portion 825A and a second leg portion 825B extending in a first direction and a third leg portion 825C and a fourth leg portion 825D extending in a second direction. The first leg portion 825A and the second leg portion 825B can be coupled to a first and second lug 856, and the third leg portion 825C and the fourth leg portion 825D can be coupled to a third and fourth lug 856 disposed across the drumhead 852 from the first and second lug 856. The first striker actuator assembly 820A can include a first cable configured to be operatively coupled to a first remote actuator (not shown). The second striker actuator assembly 820B can include a second cable configured to be operatively coupled to a second remote actuator (not shown). The first striker actuator assembly 820A is coupled to a first remote actuator 810A via a first remote coupling 840A. The second striker actuator assembly 820B is coupled to a second remote actuator 820A via a second remote coupling 840B. In some embodiments, the first striker actuator assembly 820A and/or the second striker actuator assembly 820B can be mechanically actuated (e.g., via one or more cams as described with respect to various embodiments herein). In some embodiments, the first striker actuator assembly 820A and the second striker actuator assembly 820B can be electromechanically actuated (e.g., via one or more solenoids configured to communicate with one or more remote actuators via wired or wireless communication). In some embodiments, the first striker actuator assembly 820A and/or the second striker actuator assembly 820B can each include a post with a free end such that the respective striker can rotate about the post between a contact and non-contact position.

Figure 28:
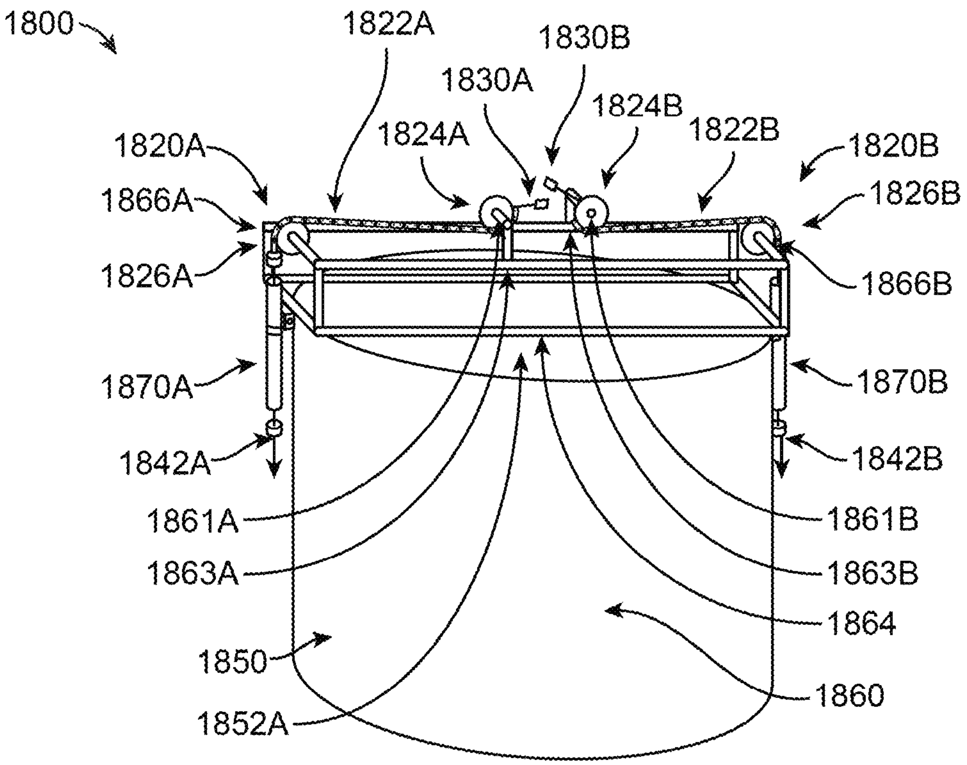
FIG. 28 is a schematic illustration of a system including a striker actuator assembly, a cable subassembly, and a cable mount disposed relative to a drum, according to an embodiment.

FIG. 28 is a schematic illustration of a system 1800. The system 1800 can be the same or similar in structure and/or function to any of the systems described herein, such as the system 500 and/or 2300. The system 1800 includes a first striker actuator assembly 1820A, a second striker actuator assembly 1820B, and a mount 1860 that is shared by the first striker actuator assembly 1820A and the second striker actuator assembly 1820B. The mount 1860 can be mounted to span from a first edge to a second edge of a rim of the drum 1850. The system 1800 includes a first cable subassembly 1870A including a first cable 1842A that is configured to be operatively coupled to a first remote actuator (not shown) (e.g., any of the remote actuators described herein)

such that the first remote actuator can control a position of a first striker 1830A via the first cable subassembly 1870A and the first striker actuator assembly 1820A. The system 1800 includes a second cable subassembly 1870B including a second cable 1842B that is configured to be operatively coupled to the first remote actuator or a second remote actuator (not shown) (e.g., any of the remote actuators described herein) such that the first remote actuator or the second remote actuator can control a position of a second striker 1830B via the second cable subassembly 1870B and the second striker actuator assembly 1820B.

Each of the first striker actuator assembly 1820A and the second striker actuator assembly 1820B can be the same or similar in structure and/or function to any of the striker actuator assemblies described herein, such as the striker actuator assembly 420 and/or the striker actuator assembly 1420. For example, the first striker actuator assembly 1820A includes a first cam 1824A, a first chain 1822A, a second cam 1826A, a spring (not shown), a first rotatable crossbar 1861A, and a second rotatable crossbar 1866A, which can each be the same or similar in structure and/or function the first cam 423, the chain 422, the second cam 426, the spring 428, the first rotatable crossbar 461, and the second rotatable crossbar 466, respectively. The second striker actuator assembly 1820B includes a first cam 1824B, a chain 1822B, a second cam 1826B, a spring (not shown), a first rotatable crossbar 1861B, and a second rotatable crossbar 1866B, which can each be the same or similar in structure and/or function the first cam 423, the chain 422, the second cam 426, the spring 428, the first rotatable crossbar 461, and the second rotatable crossbar 466, respectively. As shown in FIG. 28, the mount 1860 can include a box frame 1864 which includes the second rotatable crossbar 1866A and the second rotatable crossbar 1866B as opposing segments of the box frame 1864. A first post 1863A and a second post 1863B extend upward from opposing segments of the box frame 2364 to support the first rotatable crossbar 1861A and the second rotatable crossbar 1861B, respectively. Each of the first rotatable crossbar 1861A and the second rotatable crossbar 1861B can have a free end and can extend parallel to each other and from opposing sides of the box frame 1864. The spring of the first striker actuator assembly 1820A can have a first end coupled to the first rotatable crossbar 1866A and a second end coupled to the box frame 1864 of the mount 1860. The spring of the second striker actuator assembly 1820B can have a first end coupled to the second rotatable crossbar 1866B and a second end coupled to the box frame 1864 of the mount 1860. The mount 1860 can also include a first clamp (not shown) and a second clamp (not shown) coupled to the box frame 1864 and extending downward such that the box frame 1864 can be mounted to opposing lugs or rim portions of the drum 1850 via the first clamp and the second clamp and the first striker actuator assembly 1820A and the second striker actuator assembly 1820B can rotate the first striker 1830A and the second striker 1830B into and out of contact with the drumhead 1852A of the drum 1850.

Figure 29:
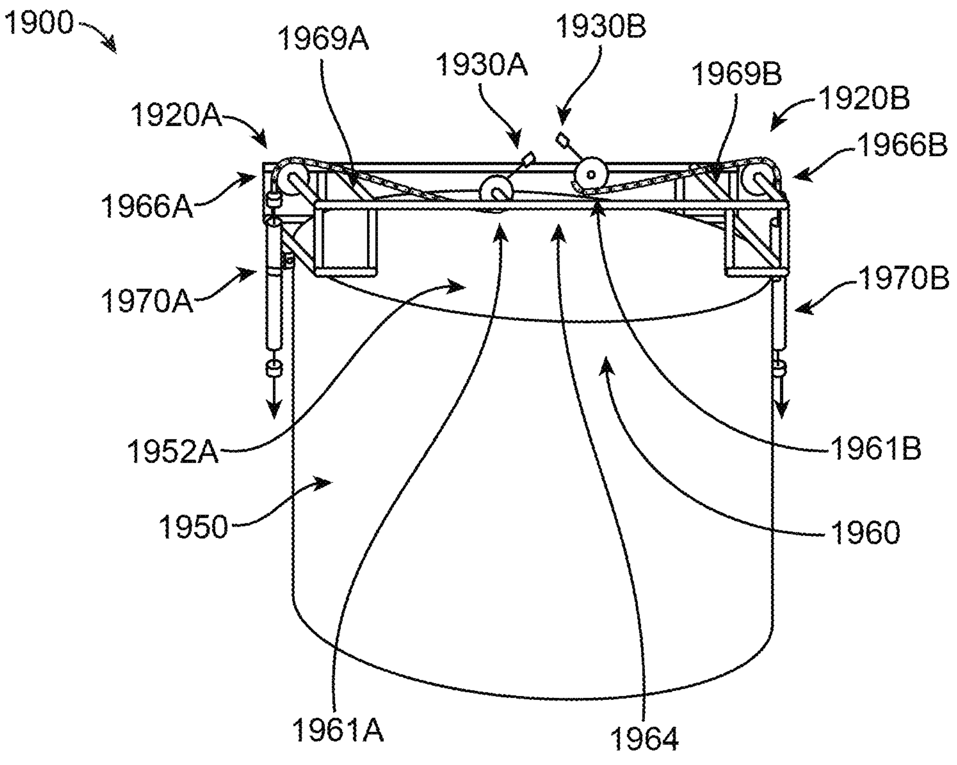
FIG. 29 is a schematic illustration of a system including a striker actuator assembly, a cable subassembly, and a cable mount disposed relative to a drum, according to an embodiment.

FIG. 29 is a schematic illustration of a system 1900. The system 1900 can be the same or similar in structure and/or function to any of the systems described herein, such as the system 500, 1800, and/or 2300. The system 1900 includes a first striker actuator assembly 1920A, a second striker actuator assembly 1920B, and a mount 1960 that is shared by the first striker actuator assembly 1920A and the second striker actuator assembly 1920B. The system 1900 includes a first cable subassembly 1970A and a second cable subassembly 1970B. As shown in FIG. 29, the mount 1960 can include a rectangular frame 1964 which includes a second rotatable crossbar 1966A and the second rotatable crossbar 1966B as opposing segments of the rectangular frame 1964. The system 1900 can be constructed and operated similarly to the system 1800 described above, except that, rather than having a first post and a second post extending upward from opposing segments of a frame to support the first rotatable crossbar and the second rotatable crossbar, the first rotatable crossbar 1961A and the second rotatable crossbar 1961B can extend directly from the rectangular frame 1964 and have a free end. Additionally, each of the first striker actuator assembly 1920A and the second striker actuator assembly 1920B can be mounted to the drum 1950 similarly as described with respect to the striker actuator assembly 420 above. The frame 1964 can optionally include a first support brace 1969A and a second support brace 1969B extending between sidebars of the frame 1964 in a plane parallel to a plane including the drumhead 1952.

Figure 16:
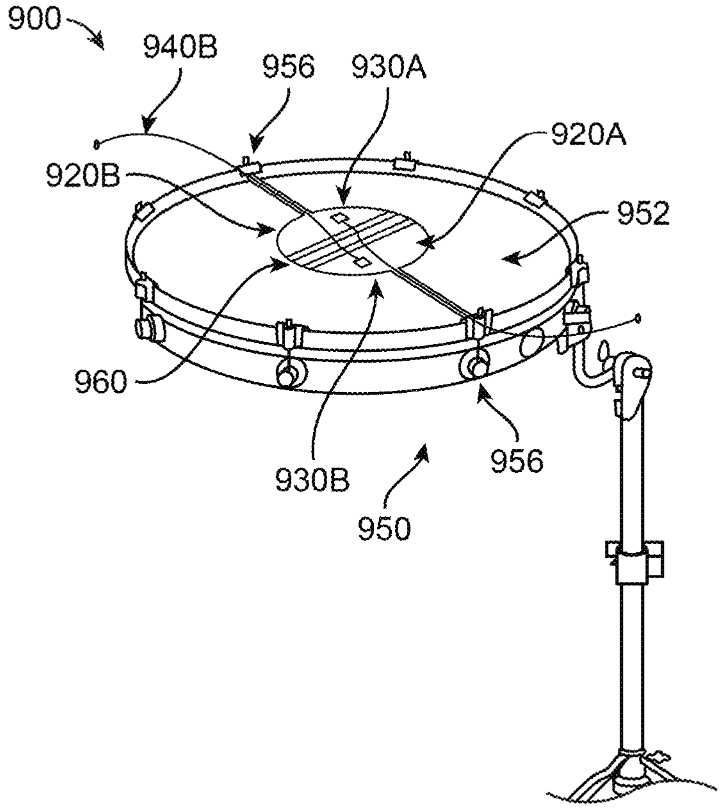
FIG. 16 is a schematic illustration of a perspective view of a system, according to an embodiment.

In some embodiments, rather than the strikers extending toward a center of the drumhead, the strikers can extend away from the drumhead. For example, FIG. 16 is a schematic illustration of a system 900 mounted on a drum 950. The system 900 can be the same or similar in structure and/or function to any of the systems described herein. The system 900 includes a first striker actuator assembly 920A and a second striker actuator assembly 920B sharing a common mount 960. The mount 960 is configured to be mounted across a drumhead 952. The first striker actuator assembly 920A is coupled to a first remote actuator (not shown) via a first remote coupling 940A. The second striker actuator assembly 920B is coupled to a second remote actuator (not shown) via a second remote coupling 940B. As shown in FIG. 16, the strikers 930A and 930B extend from the center of the mount 960 toward the edges of the drum 950 in opposite directions. In some embodiments, the first striker actuator assembly 920A and/or the second striker actuator assembly 920B can be mechanically actuated (e.g., via one or more cams as described with respect to various embodiments herein). In some embodiments, the first striker actuator assembly 920A and the second striker actuator assembly 920B can be electromechanically actuated (e.g., via one or more solenoids configured to communicate with one or more remote actuators via wired or wireless communication).

Figure 17:
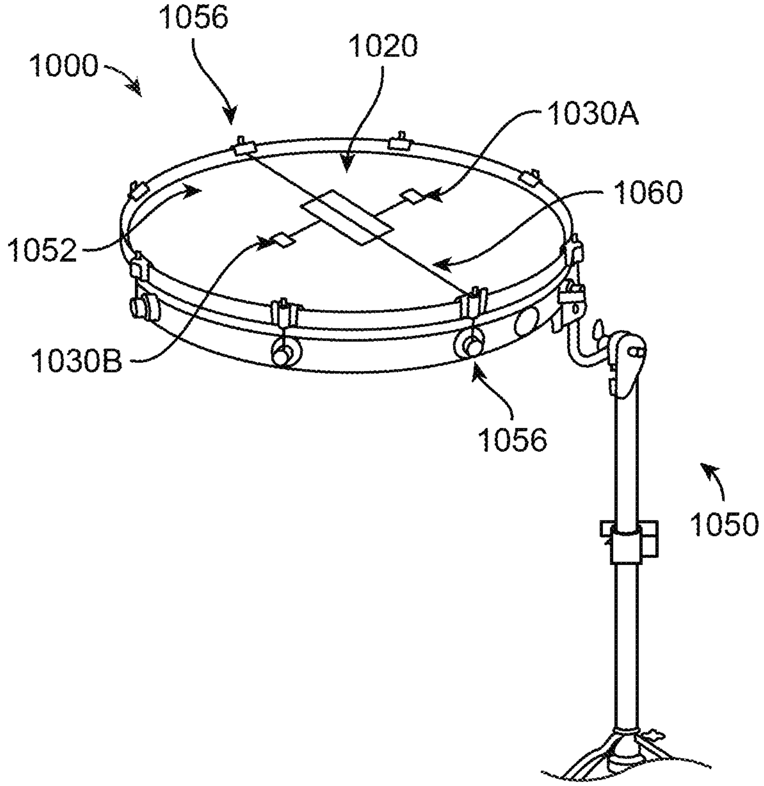
FIG. 17 is a schematic illustration of a perspective view of a system, according to an embodiment.

In some embodiments, rather than including two striker actuator assemblies, a system can include a single actuation assembly configured to transition more than one striker into contact with a drumhead. For example, FIG. 17 is a schematic illustration of a system 1000 mounted on a drum 1050. The system 1000 can be the same or similar in structure and/or function to any of the systems described herein. The system 1000 includes a striker actuator assembly 1020 having a mount 1060. The mount 1060 is configured to be mounted across a drumhead 1052. The striker actuator assembly 1020 is coupled to a remote actuator (not shown) via a remote coupling 1040 (e.g., wirelessly or via a wire). As shown in FIG. 17, strikers 1030A and 1030B are coupled to the striker actuator assembly 1020 and extend from the center of the mount 1060 toward the edges of the drum 1050 in opposite directions. In some embodiments, the striker actuator assembly 1020 can be mechanically actuated (e.g., via one or more cams as described with respect to various embodiments herein). In some embodiments, the striker actuator assembly 1020 can be electromechanically actuated (e.g., via one or more solenoids configured to communicate with a remote actuator via wired or wireless communication).

Figure 18:
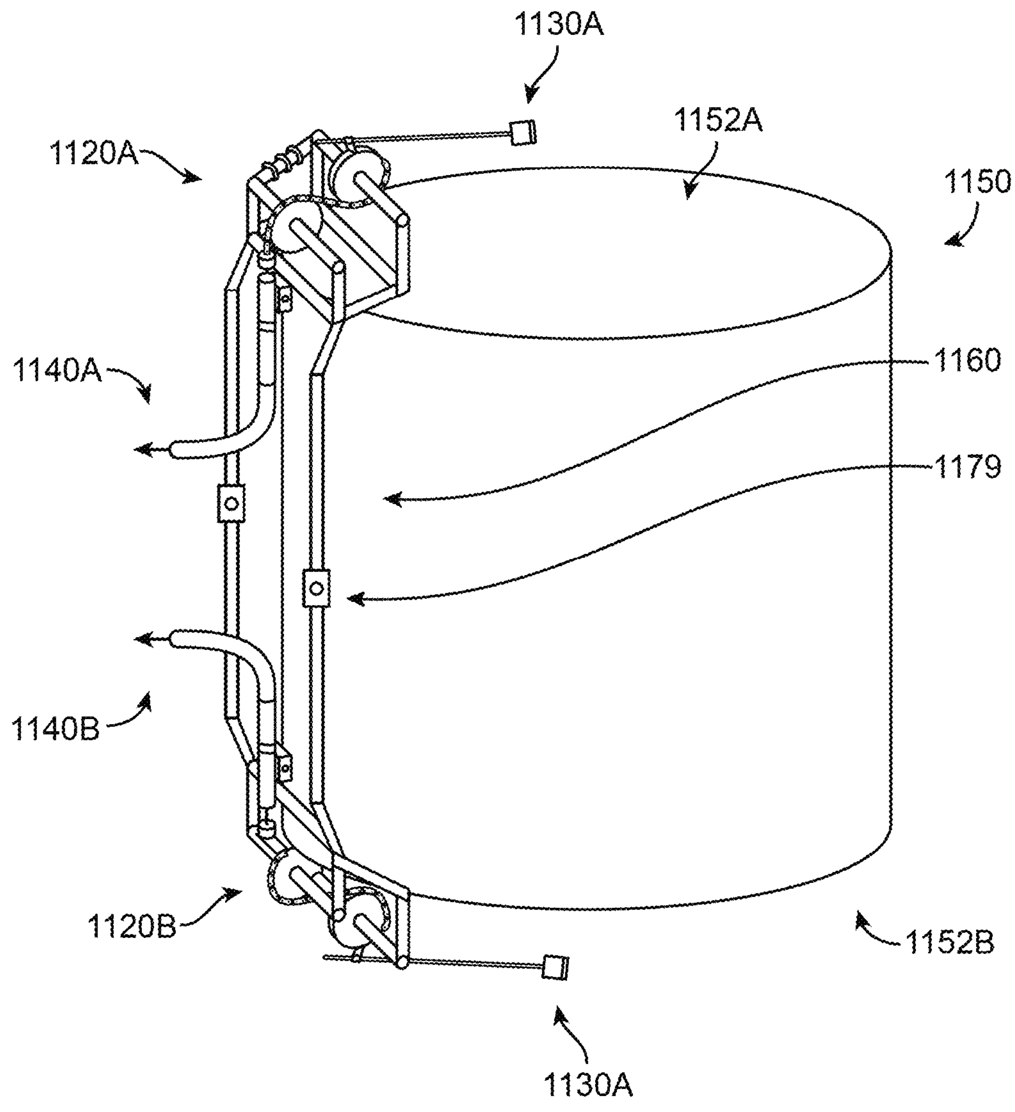
FIG. 18 is a schematic illustration of a perspective view of a system, according to an embodiment.

FIG. 18 is a schematic illustration of a portion of a system 1100 coupled to a drum 1150. The system 1100 can be the same or similar in structure and/or function to any of the systems described herein. The system 1100 includes a first striker actuator assembly 1120A and a second striker actuator assembly 1120B sharing a common mount 1160. The mount 1160 is configured to be mounted on a side of the drum 1150 (e.g., to opposing hoops, rims, and/or lugs) such that the first striker actuator assembly 1120A is configured to rotate a striker 1130A into contact with a first drumhead 1152A on a first side of the drum 1150 and such that the second striker actuator assembly 1120B is configured to rotate a striker 1130B into contact with a second drumhead 1152B on a second side of the drum 1150 opposite the first side. The first striker actuator assembly 1120A is coupled to a first remote actuator (not shown) via a first remote coupling 1140A (e.g., a cable). The second striker actuator assembly 1120B is coupled to a second remote actuator (not shown) via a second remote coupling 1140B (e.g., a cable). The first remote coupling 1140A and the second remote coupling 1140B can be coupled to a first and second remote actuator interchangeably to allow the user to select which remote actuator is associated with (e.g., controls) which striker 1130. The mount 1160 is configured to be secured to one, two, or more lug screws on the top and/or bottom of the drum 1150. Optionally, the mount 1160 can include an expandable and retractable portion 1179 that can be adjusted to change the length of the mount 1160 to be secured to different size drums. The expandable and retractable portion 1179 can include, for example, two parallel pairs of an outer tube and an inner tube collectively spanning the length between the first striker actuator assembly 1120A and the second striker actuator assembly 1120B. The inner tube of each pair can be slid into and out of a lumen of the outer tube of each pair and secured in place by a securement mechanism to set the mount 1160 at a particular overall length.

Figure 19:
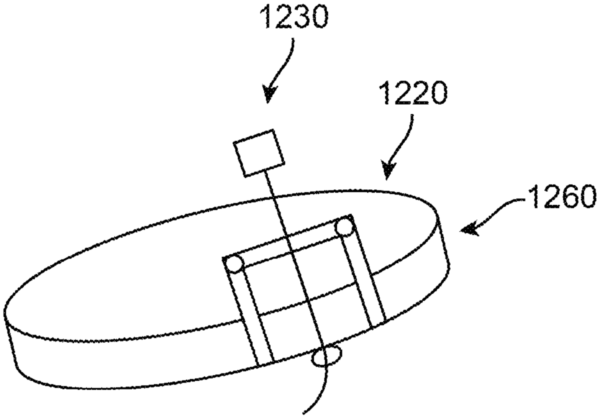
FIG. 19 is a schematic illustration of a perspective view of a system, according to an embodiment.
Figure 20:
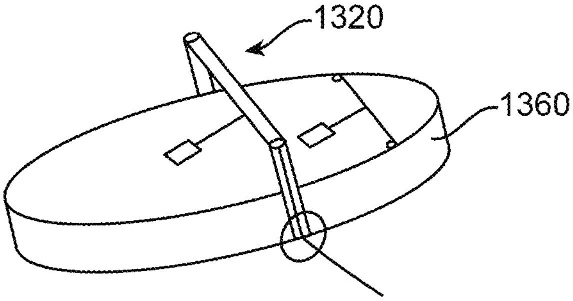
FIG. 20 is a schematic illustration of a perspective view of a system, according to an embodiment.

In some embodiments, rather than being configured to be coupled to one or more lugs or one or more portions of a rim or hoop of a drum, any of the striker actuator assemblies described herein can be coupled to a rim or hoop shaped accessory that can be attached to (e.g., placed over) a rim or hoop of a drum. For example, FIG. 19 is a schematic illustration of a striker actuator assembly disposed on an edge of a rim shaped accessory that is configured to be attached to a top of a drum such that a striker coupled to the striker actuator assembly can be transitioned into contact with a drumhead of the drum. FIG. 20 is a schematic illustration of a striker actuator assembly disposed across a rim shaped accessory that is configured to be attached to a top of a drum such that a striker coupled to the striker actuator assembly can be transitioned into contact with a drumhead of the drum. The strike actuation assembly can be centered or off-center relative to a center of the opening defined by the rim shaped accessory.

Figure 21A:
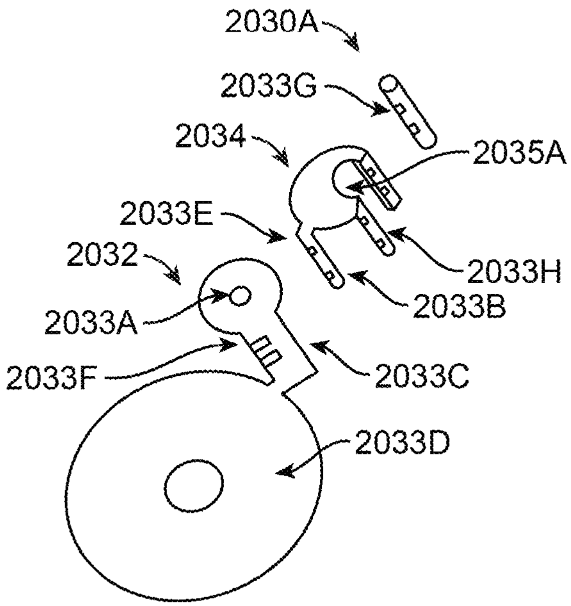
FIG. 21A is a schematic illustration of a cam, an adapter, and a striker, according to an embodiment.

In some embodiments, a cam, such as a cam of a foot pedal actuator or a cam of any of the striker actuation assemblies described herein, can be configured to be coupled directly to a striker (e.g., via aligning respective recesses of the striker and cam and inserting pins or screws). In some embodiments, a cam, such as a cam of a foot pedal actuator or a cam of any of the striker actuation assemblies described herein, can be configured to be coupled to a striker via an adapter such that a striker having a smaller outer diameter than a striker receiving opening of a cam can be securely and reversibly engaged with the cam. For example, FIG. 21A is a schematic illustration of a cam 2032, an adapter 2034, and a striker 2030A. The adapter 2034 includes a projection 2033B that is configured to be received within an opening or groove 2033A of the cam 2032 (e.g., an opening defined in an adapter engagement portion 2033C projecting from a main body portion 2033D of the cam 2032). The projection 2033B and the cam 2032 can include complementary engagement features such that the adapter 2034 can be reversibly secured to the cam 2032 (e.g., via pins or screws inserted through aligned recesses 2033E and 2033F, respectively). The striker 2030A can be configured to be received within an opening or groove 2035A of the adapter 2034. The striker 2030A and the adapter 2034 can include complementary engagement features such that the adapter 2034 can be reversibly secured to the striker 2030A (e.g., via pins or screws inserted through aligned recesses 2033G and 2033H, respectively). In some embodiments, the striker 2030A or any of the strikers described herein can be coupled to the adapter 2034 and/or the cam 2032 via any suitable coupling mechanism, such as a latch of the adapter 2034 and/or the cam 2032 engaging with a recess of or applying friction to a proximal portion of the striker 2030A. In some embodiments, a kit including one or more portions of any of the systems described herein can include more than one adapter 2034 having different inner diameters such that strikers of varying outer diameters can be coupled to the cam 2032 via a suitable adapter 2034.

Figure 21B:
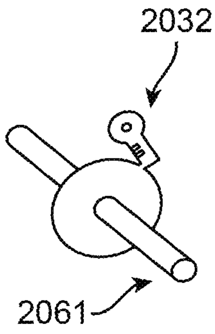
FIG. 21B is a schematic illustration of a cam disposed on a rotating crossbar, according to an embodiment.

As shown in FIG. 21B, the cam 2032 can be disposed about a rotatable crossbar 2061. In some embodiments, the cam 2032 can be fixedly coupled to the rotatable crossbar 2061 such that rotation of the cam 2032 causes rotation of the crossbar 2061, and vice versa. In some embodiments, the cam 2032 can be rotatable about the crossbar 461.

Figure 21C:
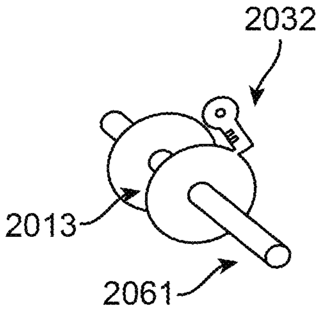
FIG. 21C is a schematic illustration of a first cam and a second cam disposed on a rotating crossbar, according to an embodiment.

As shown in FIG. 21C, in some embodiments, the cam 2032 can be disposed at a first location along the rotatable crossbar 2061 and a second cam 2013 can be disposed at a second location along the rotatable crossbar 2061. The second cam 2013 can be, for example, engaged with a chain or cable in the same manner as any of the cams described herein such that rotation of the second cam 2013 causes corresponding rotation of the rotatable crossbar 2061 and the cam 2032.

Figure 21D:
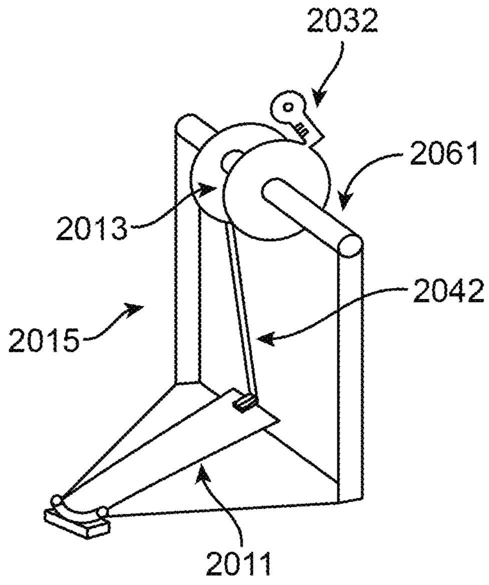
FIG. 21D is a schematic illustration of a remote actuator, according to an embodiment.

As shown in FIG. 21D, the cam 2013 can be coupled to a pedal 2011 via a chain 2042. The rotatable crossbar 2061 can be supported by a cam support 2015. Thus, if an adapter 2034 is coupled to the cam 2032 and the striker 2030A is coupled to the adapter 2034, rotation of the cam 2013 can cause the striker 2030A to strike a drumhead.

Figure 21E:
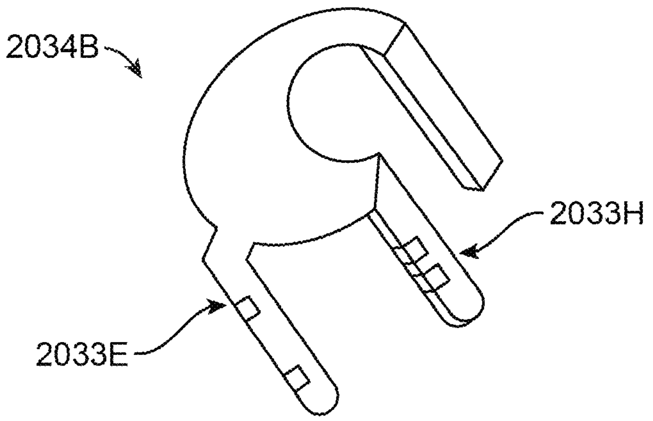
FIG. 21E is a schematic illustration of an adapter, according to an embodiment.

As shown in FIG. 21E, in some embodiments, rather than having two engagement features as shown in FIG. 21A, an adapter 2034B can include a plurality of engagement features (e.g., three or more) configured to engage with one or more corresponding engagement features of the striker 2030A and/or a plurality of engagement features (e.g., three or more) configured to engage with one or more corresponding engagement features of the cam 2032 such that the striker 2030A can be adjusted between different extension lengths relative to the adapter 2034 and the cam 2032.

Figure 21F:
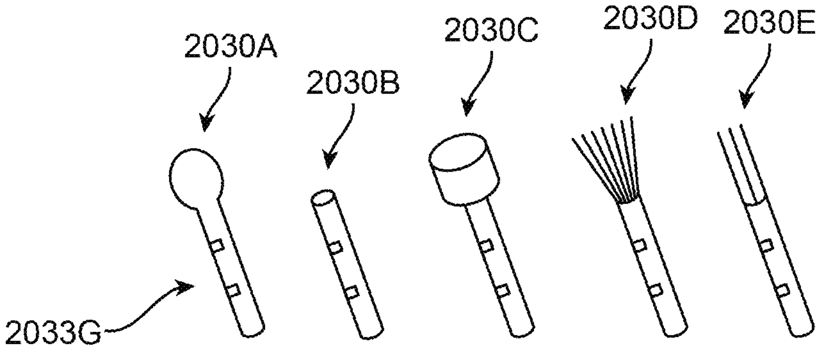
FIG. 21F is a schematic illustration of various strikers, according to an embodiment.

As shown in FIG. 21F, any suitable striker can be used in combination with the adapter 2034 or the adapter 2034B. For example, striker 2030A is a stick beat striker. Striker 2030B is a stick end striker. Striker 2030C is a mallet striker. Striker 2030D is a brush striker. Striker 2030E is a rute or multi-rod striker. Each of the strikers in FIG. 21F are shown as having recesses for engagement with an adapter 2034 or directly with a cam 2033D (identified by 2033G with respect to striker 2030A), depending on the diameter of the striker.

Figure 22:
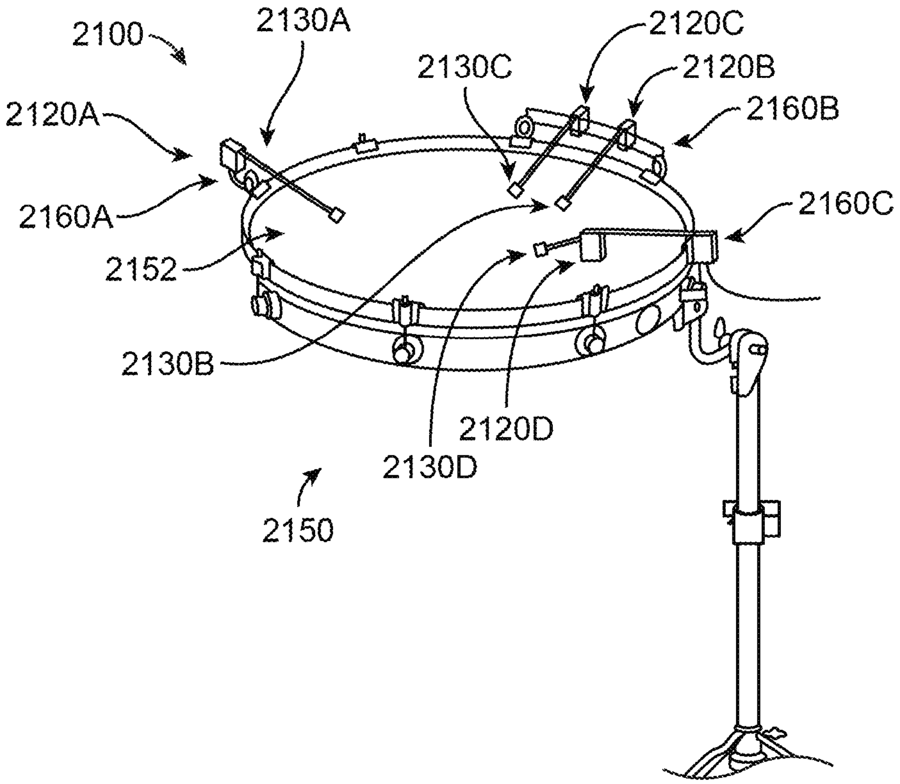
FIG. 22 is a schematic illustration of a system including solenoid-based striker actuator assemblies, according to an embodiment.

FIG. 22 is a schematic illustration of a system 2100 including solenoid-based striker actuator assemblies. The system 2100 includes a first striker actuator assembly 2120A configured to transition a first striker 2130A between a non-contact and a contact configuration relative to a drumhead 2152 of a drum 2150. The first striker actuator assembly 2120A can be coupled to a rim of the drum 2150 via a mount 2160A coupled to a lug of the rim. The system 2100 also includes a second striker actuator assembly 2120B and a third striker actuator assembly 2120C which are configured to transition a second striker 2130B and a third striker 2130C between a non-contact and a contact configuration relative to the drumhead 2152. The second striker actuator assembly 2120B and the third striker actuator assembly 2120C are mounted to the rim of the drum 2150 via a shared mount 2160B that is mounted to adjacent lugs of the rim of the drum 2150. The system 2100 includes a fourth striker actuator assembly 2120D that is configured to transition a fourth striker 2130D between a non-contact and a contact configuration relative to the drumhead 2152. The fourth striker actuator assembly 2120D is coupled to the drum 2150 via a mount 2160C that is coupled to a lug of the rim and includes a support arm extending from the rim toward the center of the drumhead 2152. The fourth striker actuator assembly 2120D is disposed on the free end of the support arm of the mount 2160C. In some embodiments, the support arm of the mount 2160C can be extendable and retractable for adjustment of the striking location of the fourth striker 2130D.

Each of the first striker actuator assembly 2120A, the second striker actuator assembly 2120B, the third striker actuator assembly 2120C, and the fourth striker actuator assembly 2120D can include an electromagnetic actuator (e.g., a solenoid actuator). Each of the first striker actuator assembly 2120A, the second striker actuator assembly 2120B, the third striker actuator assembly 2120C, and the fourth striker actuator assembly 2120D can be communicatively coupled (e.g., via a wired or a wireless connection) with a remote actuator including a sensor (e.g., a pressure sensor) configured to send an actuation signal. For example, each of the first striker actuator assembly 2120A, the second striker actuator assembly 2120B, the third striker actuator assembly 2120C, and the fourth striker actuator assembly 2120D can be coupled to a distinct portion of a one or more foot pedal actuators. Each portion can be associated with a sensor such that activation of the sensor (e.g., via pressing on the portion) causes the foot pedal actuator associated with the portion to send an actuation signal to the striker actuator assembly associated with that portion. Although FIG. 22 shows the system 2100 including four striker actuator assemblies, the system 2100 can include any suitable number of striker actuator assemblies (e.g., one, two, three, or more). Additionally, although FIG. 22 shows the striker actuator assemblies coupled directly to the lugs on the rim of the drum 2150, the striker actuator assemblies can be coupled to a hoop that can be clamped on top of the drum 2150.

Figure 23:
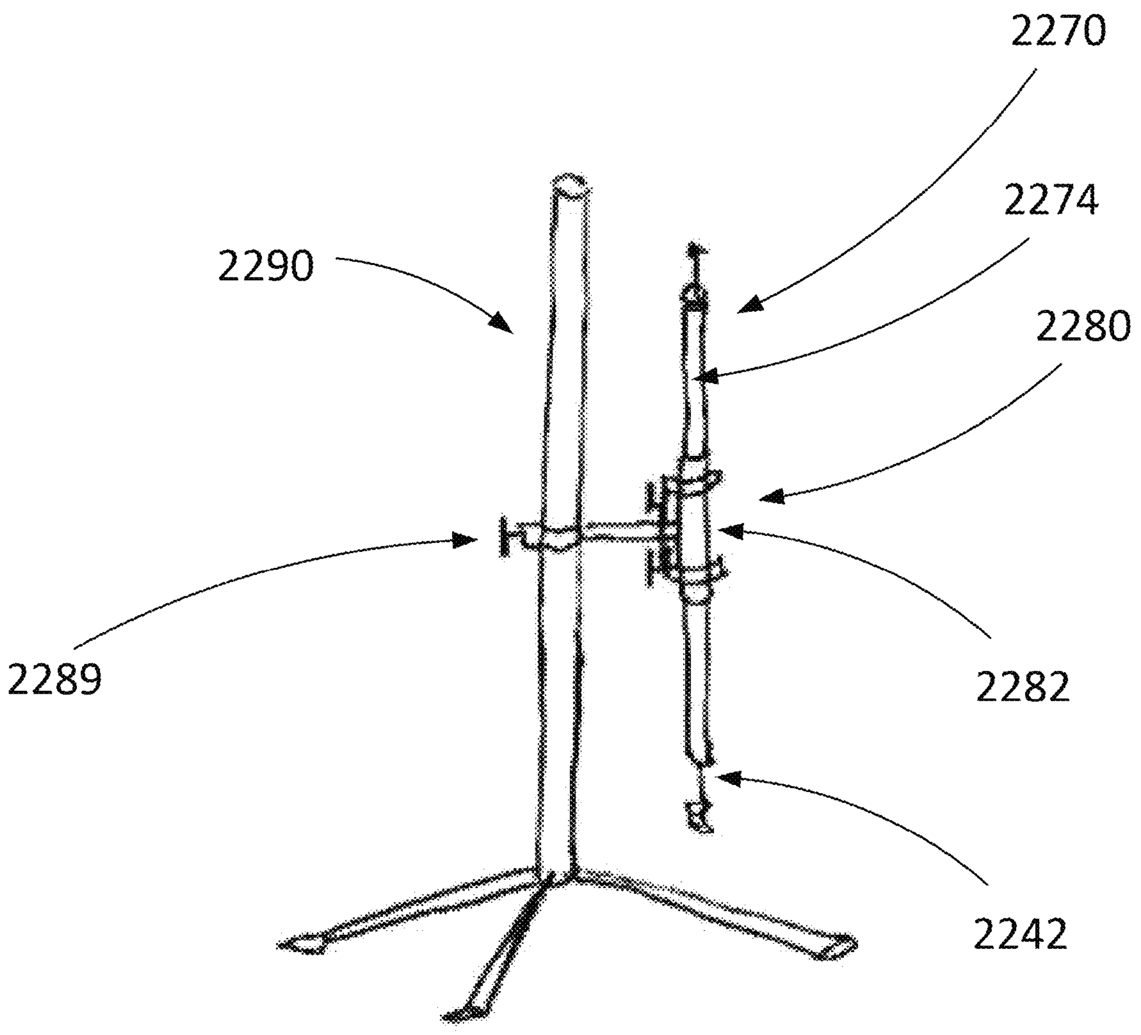
FIG. 23 is a schematic illustration of a stand configured to support a portion of a cable subassembly via a cable mount, according to an embodiment.

FIG. 23 is a schematic illustration of a stand 2290 configured to support a portion of a cable subassembly 2270 via a cable mount 2280. The cable subassembly 2270 and the cable mount 2280 can be the same or similar in structure and/or function to any of the cable subassemblies and cable mounts, respectively, described herein. The cable mount 2280 includes a tubular portion 2282 and a mounting arm 2289. The mounting arm 2289 is configured to couple the tubular portion 2282 to the stand 2290 and can be adjusted (e.g., via a thumb tightener) between various vertical positions along the stand 2290. As shown in FIG. 23, the tubular portion can have a pinch point on each end configured to engage a sheath 2274 (e.g., a flexible sheath) of the cable subassembly 2270 such that the sheath 2274 is immovable relative to the tubular portion 2282 but a cable 2242 of the cable subassembly 2270 is translatable through the sheath 2274. Thus, the stand 2290 and the cable mount 2280 can be configured to direct or guide the cable 2242 relative to other components of a drum kit, and the stand 2290 can support the mount 2280 at a location along a path of the cable subassembly 2270 between a remote actuator (not shown) (e.g., any of the striker actuator assemblies described herein) and a striker actuator assembly (not shown) (e.g., any of the striker actuator assemblies described herein) associated with (e.g., coupled to) a drum (not shown) and configured to move at least one striker between a non-contact and a contact position relative to a surface of a drumhead of the second drum.

Although many of the assemblies, devices, components, and systems described herein have been described and shown separately, the assemblies, devices, components, and systems described herein can be combined and used together in any suitable manner. For example, in some embodiments, any of the remote actuators described herein can be used in combination with any of the remote couplings described herein and any of the striker actuator assemblies described herein to move any of the strikers described herein between a contact and non-contact position relative to a surface of a drumhead. Furthermore, any of the embodiments described herein can be used with one or of any of the other embodiments described herein (e.g., within a common drum kit or system) and/or duplicated such that a common drum kit or system includes any suitable number of any of the embodiments described herein.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination and/or sub-combination, except mutually exclusive combinations. The embodiments described herein can include various combinations and/or sub-combinations of the functions, components and/or features of the different embodiments described.

The invention claimed is:

1. A system, comprising:

a remote actuator; and a striker actuator assembly operatively coupled to the remote actuator by a remote coupling, the striker actuator assembly including:

a mount configured to be coupled to a drum including a base frame, a first rotatable cam mounted on a first crossbar supported by the base frame, a striker mount configured to be coupled to a striker, the striker mount coupled to the first rotatable cam such that rotation of the first rotatable cam between a first cam position and a second cam position causes the striker to transition between a non-contact position and a contact position relative to a non-vertical surface of a drumhead of the drum, a spring configured to urge the first rotatable cam toward the first cam position such that the striker is biased toward the non-contact position, a second rotatable cam mounted on a second crossbar supported by the base frame, and an elongated member including a first end fixedly coupled to the first rotatable cam, a portion disposed along and in contact with a portion of a perimeter of the second rotatable cam, and a second end coupleable to the remote coupling such that, in response to actuation of the remote actuator, the remote coupling actuates the striker actuator assembly by translating the second end of the elongated member away from the second rotatable cam, causing the second rotatable cam to rotate in a first direction and causing the first end of the elongated member to rotate the first rotatable cam in a second direction opposite the first direction to transition from the first cam position to the second cam position.

2. The system of claim 1, wherein the remote coupling includes a cable subassembly including a sheath, a cable disposed within the sheath, a first coupling element configured to be removably coupled to the second end of the elongated member of the striker actuator assembly, and a second coupling element configured to be removably coupled to the remote actuator such that actuation of the remote actuator causes the remote actuator to pull on the second coupling element to translate the cable within the sheath and cause the first coupling element of the cable subassembly to translate the second end of the elongated member away from the second rotatable cam to actuate the striker actuator assembly such that the striker is transitioned between the non-contact position and the contact position.

3. The system of claim 1, wherein the remote coupling includes a cable subassembly and the drum is a first drum, the system further comprising a cable mount configured to mount a portion of the cable subassembly to a portion of a second drum disposed along a path of the cable subassembly between the remote actuator and the striker actuator assembly.

4. The system of claim 1, wherein the remote coupling includes a wireless coupling.

5. The system of claim 1, wherein the striker actuator assembly includes an electromechanical actuator.

6. The system of claim 1, wherein the first rotatable cam can be fixedly coupled to the first crossbar and the first crossbar can be rotatable, the first crossbar biased by the spring toward an initial crossbar position in which the first rotatable cam is in the first cam position.

7. The system of claim 1, wherein the striker mount includes an adapter directly coupled to the first rotatable cam such that the first rotatable cam is configured to be removably engaged with the striker via the adapter.

8. The system of claim 6, wherein the striker actuator assembly includes a striker cam fixedly coupled to the first crossbar, the striker mount being directly coupled to the striker cam such that the striker cam is configured to be removably engaged with the striker via the striker mount and to transition the striker between the non-contact position and the contact position in response to the first rotatable cam rotating between the first cam position and the second cam position.

9. The system of claim 1, wherein the remote actuator includes a foot pedal, a rotatable crossbar, and a cam mounted to the rotatable crossbar, the cam coupled to the remote coupling, at least one of the rotatable crossbar or the cam coupled to the foot pedal via an elongated member such that depression of the foot pedal causes rotation of the cam.

10. The system of claim 1, wherein the mount of the striker actuator assembly is configured to extend from a first portion of a rim of the drum to a second portion of the rim of the drum in a plane parallel to the surface of the drumhead.

11. The system of claim 1, wherein the mount of the striker actuator assembly includes a hoop configured to be placed over a rim of the drum.

12. The system of claim 1, wherein the portion of the elongated member is a first portion, the elongated member including a second portion between the first portion and the first end, the first portion disposed along and in contact with an upper portion of a perimeter of the second rotatable cam, the second portion disposed along and in contact with a lower portion of a perimeter of the first rotatable cam.

13. A system, comprising:

a remote actuator including a linkage and an energy transfer mechanism coupled to an end of the linkage, the linkage including at least one of a cable, chain, strap, or rope;

a remote coupling including a cable subassembly, the cable subassembly including a flexible sheath, a cable disposed within the sheath, a first coupling element disposed on a first end of the cable and coupleable to the energy transfer mechanism of the remote actuator, and a second coupling element disposed on a second end of the cable, the energy transfer mechanism having a mating surface configured to receive an outer surface of the first coupling element such that the energy transfer mechanism is releasably engaged with the first coupling element and releasably securable to the first coupling element via one or more engagement elements; and a striker actuator assembly configured to be releasably engaged with the second coupling element, the striker actuator assembly including a mount configured to couple a striker to a drum, the striker actuator assembly configured to transition the striker between a non-contact and a contact position relative to a surface of a drumhead of a drum in response to actuation of the remote actuator due to the actuation causing the linkage to translate the energy transfer mechanism and the first coupling element such that the cable translates relative to the sheath and translates the second coupling element to cause the striker actuator assembly to transition the striker between the non-contact and the contact position when the drumhead is physically inaccessible to a user.

14. The system of claim 13, wherein the drum is a first drum, the system further comprising a cable mount configured to mount a portion of the sheath of the cable subassembly to a portion of a second drum disposed along a path of the cable subassembly between the remote actuator and the striker actuator assembly.

15. The system of claim 13, wherein the striker is a first striker and the drum is a first drum, the remote actuator configured to be coupled to a second striker and a rim of a second drum, the remote actuator configured to transition the second striker between a non-contact position and a contact position relative to a surface of a vertical drumhead of the second drum.

16. The system of claim 13, wherein the energy transfer mechanism is configured to receive the first coupling element such that a first opening defined in the energy transfer mechanism is aligned with a second opening defined in the first coupling element and an engagement element from the one or more engagement elements can be selectively disposed within the first opening and the second opening to secure the energy transfer mechanism to the first coupling element.

17. The system of claim 16, wherein the energy transfer mechanism defines an interior within which the energy transfer mechanism is configured to receive the first coupling element.

18. The system of claim 13, wherein the remote actuator includes a rotatable cam, the energy transfer mechanism is fixedly coupled to a curved outer surface of the rotatable cam, and each of the energy transfer mechanism and the first coupling element include a curved perimeter portion shaped to complement the outer surface of a cam of the remote actuator.

19. A system, comprising:

a remote actuator; and a striker actuator assembly operatively coupled to the remote actuator by a remote coupling, the striker actuator assembly including a mount configured to couple a striker to a drum, the mount of the striker actuator assembly including a hoop configured to be placed over a rim of the drum, the striker actuator assembly configured to transition the striker between a non-contact position and a contact position relative to a non-vertical surface of a drumhead of the drum in response to actuation of the remote actuator.

20. A system, comprising:

a remote actuator;

a first remote coupling including a cable subassembly, the cable subassembly including a flexible sheath, a cable disposed within the sheath, a first coupling element disposed on a first end of the cable and coupleable to the remote actuator, and a second coupling element disposed on a second end of the cable;

a first striker actuator assembly operatively coupleable to the second coupling element, the first striker actuator assembly including a mount configured to couple a first striker to a first drum, the first striker actuator assembly configured to transition the first striker between a non-contact and a contact position relative to a surface of a drumhead of a drum in response to actuation of the remote actuator due to the actuation causing the cable to translate relative to the sheath to cause the first striker actuator assembly to transition the first striker between the non-contact and the contact position when the drumhead is physically inaccessible to a user; and a second remote coupling configured to couple the remote actuator to a second striker actuator assembly including a mount configured to couple a second striker to a second drum, the second striker actuator assembly configured to transition the second striker between a non-contact and a contact position relative to a surface of a drumhead of the second drum in response to actuation of the remote actuator.

21. The system of claim 20, wherein:

the second remote coupling includes a cable subassembly, the cable subassembly of the second remote coupling including a flexible sheath, a cable disposed within the sheath of the second remote coupling, a first coupling element disposed on a first end of the cable of the second remote coupling and coupleable to the remote actuator, and a second coupling element disposed on a second end of the cable of the second remote coupling and coupleable to the second striker actuator assembly.

* * * * *